United States Patent [19]
Koma

[11] Patent Number: 6,157,428
[45] Date of Patent: *Dec. 5, 2000

[54] LIQUID CRYSTAL DISPLAY

[75] Inventor: Norio Koma, Motosu-gun, Japan

[73] Assignee: Sanyo Electric Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/852,486

[22] Filed: May 7, 1997

[51] Int. Cl.[7] .................................................. G02F 1/1343
[52] U.S. Cl. ............................................ 349/138; 349/123
[58] Field of Search ................................ 349/38, 42, 138, 349/139, 123

[56] References Cited

U.S. PATENT DOCUMENTS

| | | |
|---|---|---|
| 5,051,570 | 9/1991 | Tsujikawa et al. . |
| 5,084,778 | 1/1992 | Dejule et al. . |
| 5,084,905 | 1/1992 | Sasaki et al. . |
| 5,136,407 | 8/1992 | Clerc . |
| 5,229,873 | 7/1993 | Hirose et al. . |
| 5,309,264 | 5/1997 | Lien et al. ................................ 359/87 |
| 5,585,951 | 12/1996 | Noda et al. . |
| 5,608,556 | 3/1997 | Koma ...................................... 349/143 |
| 5,612,799 | 3/1997 | Yamazaki et al. . |
| 5,748,275 | 5/1998 | Sato et al. . |
| 5,784,132 | 7/1998 | Hashimoto . |
| 5,808,712 | 9/1998 | Hishida et al. ............................ 349/95 |
| 5,825,448 | 10/1998 | Bos et al. . |
| 5,855,968 | 1/1999 | Hirata et al. . |
| 5,859,683 | 1/1999 | Tagusa et al. ............................ 349/138 |
| 5,956,105 | 9/1999 | Yamazaki et al. . |
| 5,990,491 | 11/1999 | Zhang . |

FOREIGN PATENT DOCUMENTS

| | | |
|---|---|---|
| 0751417 | 1/1997 | European Pat. Off. . |
| 0766119 | 4/1997 | European Pat. Off. . |
| 0603866 | 6/1997 | European Pat. Off. . |
| 61-141174 | 6/1986 | Japan .............................. H01L 27/14 |
| 1156725 | 6/1989 | Japan .............................. G02F 1/133 |
| 2234134 | 9/1990 | Japan .............................. G02F 1/136 |
| 3-111818 | 5/1991 | Japan . |
| 4-319920 | 11/1992 | Japan . |
| 5-210114 | 8/1993 | Japan . |
| 6-130394 | 5/1994 | Japan . |
| 6-194656 | 7/1994 | Japan . |
| 6-194657 | 7/1994 | Japan . |

OTHER PUBLICATIONS

Tsuyoshi Yamamoto, et al., "Full–Cone Wide–Viewing–Angle Multicolor CSH–LCD" SID 91 Digest, pp. 762–765.

*Primary Examiner*—Frank G. Font
*Assistant Examiner*—Andrew H. Lee
*Attorney, Agent, or Firm*—Hogan & Hartson, LLP

[57] ABSTRACT

A liquid crystal display is disclosed in which a TFT is formed by forming on a substrate (10), a gate electrode (11), a gate insulation film (13), an a-Si layer (14), an etching stopper (15), an ($N^+$a-Si) layer (16), a source electrode (17), and a drain electrode (18) in this sequence. Covering this TFT, an inter-layer insulation film (20) is formed, on which a pixel electrode (22) is then formed. In a common electrode (31), there is formed an orientation control window (32) where no electrodes are situated. With this arrangement, it is possible to prevent the orientation of liquid crystal molecules from being disturbed due to the influence of electric fields generated by the gate electrode (11), the drain electrode (18), or their respective associated lines. As a result, the orientation of liquid crystal molecules is effectively controlled through electric fields generated in the sloped direction around the edges of the pixel electrode (22) and orientation control window (32), thereby obtaining preferable pixel dividing and a wider range of visibility.

23 Claims, 22 Drawing Sheets

LIQUID CRYSTAL DISPLAY

BACKGROUND OF THE INVENTION

1. Field of the Invention

The present invention relates to a liquid crystal display (LCD) utilizing the electro-optical anisotropy of liquid crystal, and in particular, to an LCD for achieving a high aperture ratio and a wide viewing angle.

2. Description of the Prior Art

The LCD is advantageous in that it is small and light-weight, and has low power consumption. It is thus put into practical use in such fields as in OA and AV equipment. In particular, the active matrix type which uses a thin film transistor (TFT) for the switching element can, in principle, perform static drive of 100% duty ratio in a multiplexed manner, and is used for large screen, animation displays.

FIGS. 1 and 2 show the structure of a unit pixel for a conventional LCD; FIG. 1 is a plane view, and FIG. 2 is a cross-sectional view along the line F—F in FIG. 1. A substrate 200 made of glass, etc., is provided, and a gate electrode 201 made of Cr, etc., and a gate line 202 made of Cr, etc., are formed thereon. Gate line 202 integrally connects a row of gate electrodes 201 aligned in the same row direction. Covering them, a gate insulation film 203 made of $Si_3N_4$, etc., is formed. On gate insulation film 203, there is formed an island-like amorphous silicon (a-Si) layer 204 in a region corresponding to gate electrode 201. The a-Si layer 204 will act as an operating layer for the TFT. Amorphous silicon regions doped with impurities, are formed at both ends of a-Si layer 204 creating ($N^+$a-Si) layers 206 to act as contact layers. Between a-Si layer 204 and ($N^+$a-Si) layers 206, an etching stopper 205 made of $Si_3N_4$ is formed as required for structural reasons. Further, on ($N^+$a-Si) layers 206, there are respectively disposed a source electrode 207 and a drain electrode 208 both made of material having a high-melting point, such as Al/Si, etc. In regions other than a TFT region on gate insulation film 203, a pixel electrode 210 is formed, made of Indium Tin Oxide (ITO) which is transparent and conductive. Further, a drain line 209 is also provided for integrally connecting a column of drain electrodes 208 aligned in the same column direction. Covering all of the components mentioned above, an alignment layer 211 made of a polymer film, such as polyamide, is formed. Alignment layer 211 is subjected to predetermined rubbing processing for controlling the initial orientation of liquid crystal molecules. On alignment layer 211, a liquid crystal layer 230 is formed, on which another glass substrate 220 is disposed opposing substrate 200. A common electrode 221 made of ITO is formed on the entire surface of glass substrate 220, opposing substrate 200. Common electrode 221 is covered by an alignment layer 222 made of polyamide, etc., which is subjected to rubbing processing.

Liquid crystal is a nematic phase having, for instance, positive anisotropy of dielectric constant. When it is used for an LCD, a twist nematic (TN) mode is employed in which orientation vectors of liquid crystal molecules are twisted by 90 degrees between the top and bottom substrates 200, 220. A polarizing plate (not shown) is generally provided outside each substrates 200/220 such that, in the TN mode, a polarizing axis thereof matches a rubbing direction of alignment layer 211/222 on corresponding substrate 200/220. Thus, when no voltage is applied, linearly polarized light incoming through one of the polarizing plates proceeds within liquid crystal layer 230 while revolving along the twisted orientation of the liquid crystal molecules, until it comes out from the other polarizing plate. The LCD then displays white. On the other hand, a predetermined voltage is applied between pixel electrode 210 and common electrode 221, and an electric field is formed in liquid crystal layer 230, so that liquid crystal molecules change their orientation due to their dielectric constant anisotropy such that their long axes become parallel to the electric field. As a result, the twisted orientation of the liquid crystal molecules is destroyed, and incoming linearly polarized light is thus forced to stop revolving in liquid crystal layer 230. Then, only a reduced amount of light comes out from the other polarizing plate, resulting in a gradual change of a displayed color to black. The above mode in which an LCD displays white with no voltage applied and black with voltage applied is referred to as a normally-white mode, which is mainly employed for TN cells.

Another example is a DAP (deformation of vertically aligned phases)-type LCD which uses a nematic phase having a negative anisotropy of dielectric constant for an LCD, and a vertical alignment layer for DAP orientation films 211, 222. A DAP-type LCD, which is one example of those employing electrically controlled birefringence (ECB), utilizes a difference in a refractive index between a long axis and a short axis of liquid crystal molecules, i.e., birefringence, for controlling transmission and displayed colors. For this type, a polarizing plate is formed in a crossed Nicols arrangement outside each of substrates 200, 220. When voltage is applied, linearly polarized light introduced via one of the polarizing plates is converted into elliptically polarized light via birefringence in liquid crystal layer 230. The retardation of this elliptically polarized light, i.e., the difference in phase speed between ordinary and extraordinary ray, is controlled according to the strength of electric fields generated in liquid crystal layer 230, wherein the strength of the electric fields are determined depending on a voltage applied to liquid crystal layer 23. Then, colored light as desired will come out from the other polarizing plate on the LCD at a desired transmission according to the controlled retardation amount. As described above, an LCD obtains a desired transmission or displays desired hues by controlling light revolution or birefringence in liquid crystal. This controlling is effected by applying a desired voltage to liquid crystal which is sandwiched by a pair of substrates having predetermined electrodes formed thereon. In other words, in a TN mode, the strength of transmitted light can be controlled by controlling a retardation amount by changing the orientation of liquid crystal molecules. In an ECB mode, hue separation is also achieved by controlling the strength of transmitted light, which depends on wavelength. A retardation amount depends on an angle formed by a long axis of a liquid crystal molecule and the direction of an electric field generated in the liquid crystal. However, even if this angle is primarily controlled by adjusting electric field strength, a relative retardation amount will vary depending on an angle at which an observer views the LCD, i.e., a viewing angle. As viewing angle varies, the strength or the hues of transmitted light also changes. This is a problem of view angle dependency of an LCD.

SUMMARY OF THE INVENTION

This invention has been conceived to overcome the above problems and aims to provide a liquid crystal display for achieving a wider viewing angle through appropriate control of the orientation of liquid crystal molecules.

In order to achieve the above object, according to one aspect of the present invention, there is provided a liquid crystal display comprising a first substrate including a plurality of pixel electrodes arranged in a matrix for driving a liquid crystal; a thin film transistor having a drain electrode, a gate electrode, a semiconductor layer, and a source electrode connected to corresponding one of the plurality of pixel electrodes; a gate line connected to the gate electrode; and a drain line connected to the drain electrode; a second substrate disposed opposing the first substrate having a liquid crystal layer in between, wherein the plurality of pixel electrodes are formed on an inter-layer insulation film which has been formed covering the thin film transistor, the gate line, and the drain line; a common electrode for driving liquid crystal is formed on the second substrate; and an orientation control window of a predetermined pattern is formed to have no common electrodes formed in a region opposing each one of the corresponding plurality of pixel electrodes.

With this arrangement, a liquid crystal layer is situated away from a TFT and associated electrode lines. This distance between the former and the latter results in protecting a weak electric field around the orientation control window and an electric field sloped around the edges of a pixel electrode against the influence of electric fields generated by the TFT and lines. Then, the orientation of liquid crystal molecules can be controlled secondarily in a preferable manner through these sloped electric fields. To be more specific, variation in a retardation amount for the entire pixel can be suppressed in a structure which has been designed such that increase or decrease of a retardation amount at respective points inside a pixel is offset despite varied viewing angle. This structure can be achieved, utilizing the fact that the horizontal orientation of liquid crystal molecules in a pixel is determined according to the shape of the orientation control window. Moreover, since the above arrangement is effective in keeping the diagonal electric fields free from disturbance, it is possible to perform effective controls around the edges of a pixel electrode and an orientation control window. Therefore, preferable pixel dividing and a wider angle of visibility are realized.

In particular, an inter-layer insulation film is formed to have a thickness $\alpha$ of 0.5 $\mu$m, preferably 1 $\mu$m or more. Alternatively, the thickness $\alpha$ is defined to be at least half a distance $\chi$ between two adjacent pixel electrodes.

With an inter-layer insulation film of the above thickness, a TFT and associated electrode lines do not affect a liquid crystal layer through electric fields. Then, the orientation of liquid crystal molecules can be effectively secondarily controlled through sloped electric fields generated in the liquid crystal layer around the edges of an orientation control window and a pixel electrode.

In one aspect, a pixel electrode is formed in a region defined by the gate and drain lines, overlapping, via the inter-layer insulation film, with the gate line and/or the drain line.

That is, separated by an inter-layer insulation film, a pixel electrode is situated in a different layer from that of gate and drain lines, having a sufficient interval between them. This allows provision of a pixel electrode overlapping with the gate and drain lines so that a larger display region and an increased aperture ratio can be secured.

In another aspect, at least a part of a TFT and gate and drain lines are disposed below a pixel electrode having an inter-layer insulation film in between them.

With this arrangement, the orientation of liquid crystal molecules can be kept free from disturbance due to the influence of electric fields caused by the TFT and lines on the liquid crystal.

In another aspect, a TFT and gate and drain lines are situated, being projected from a region corresponding to the bottom of a pixel electrode by an extent y, wherein half of the extent y is equal to or less than a thickness $\alpha$ of the inter-layer insulation film, or half of an interval $\chi$ between two adjacent pixel electrodes.

The projected TFT and associated lines as above do not cause any difference in the effect in eliminating the influence of the electric fields caused by the TFT and lines on the liquid crystal.

In another aspect, an orientation control window is formed in a region opposite to a pixel electrode, for instance, along the diagonal line of the pixel electrode. Alternatively, it is shaped substantially like the letter X such that its crossing point falls on the opposing region corresponding to around the center of the pixel electrode.

With either arrangement, when a voltage is applied between a common electrode and respective pixel electrodes, electric fields are generated in the sloped direction around the edges of the orientation control window and the pixel electrode without receiving adverse influence from electric fields which have been generated by the electrodes and lines situated below. As a result, liquid crystal molecules can be easily controlled to have appropriate orientation.

In another aspect, an orientation control window is formed including a linear part extending straight and substantially in parallel to any of the edges of a pixel electrode, and branch parts extending continuously from both ends of the linear part toward respective corners of the pixel electrode, wherein the linear part is formed on a region opposing a region around the center of the pixel electrode. With this arrangement, the orientation of liquid crystal molecules can be controlled to be in a further appropriate condition.

BRIEF DESCRIPTION OF THE DRAWINGS

The above and the other objects, features, and advantages, will become further apparent from the following description of the preferred embodiments taken in conjunction with the accompanying drawings wherein.

DESCRIPTION OF THE PREFERRED EMBODIMENTS

Embodiment 1

Figure 1:
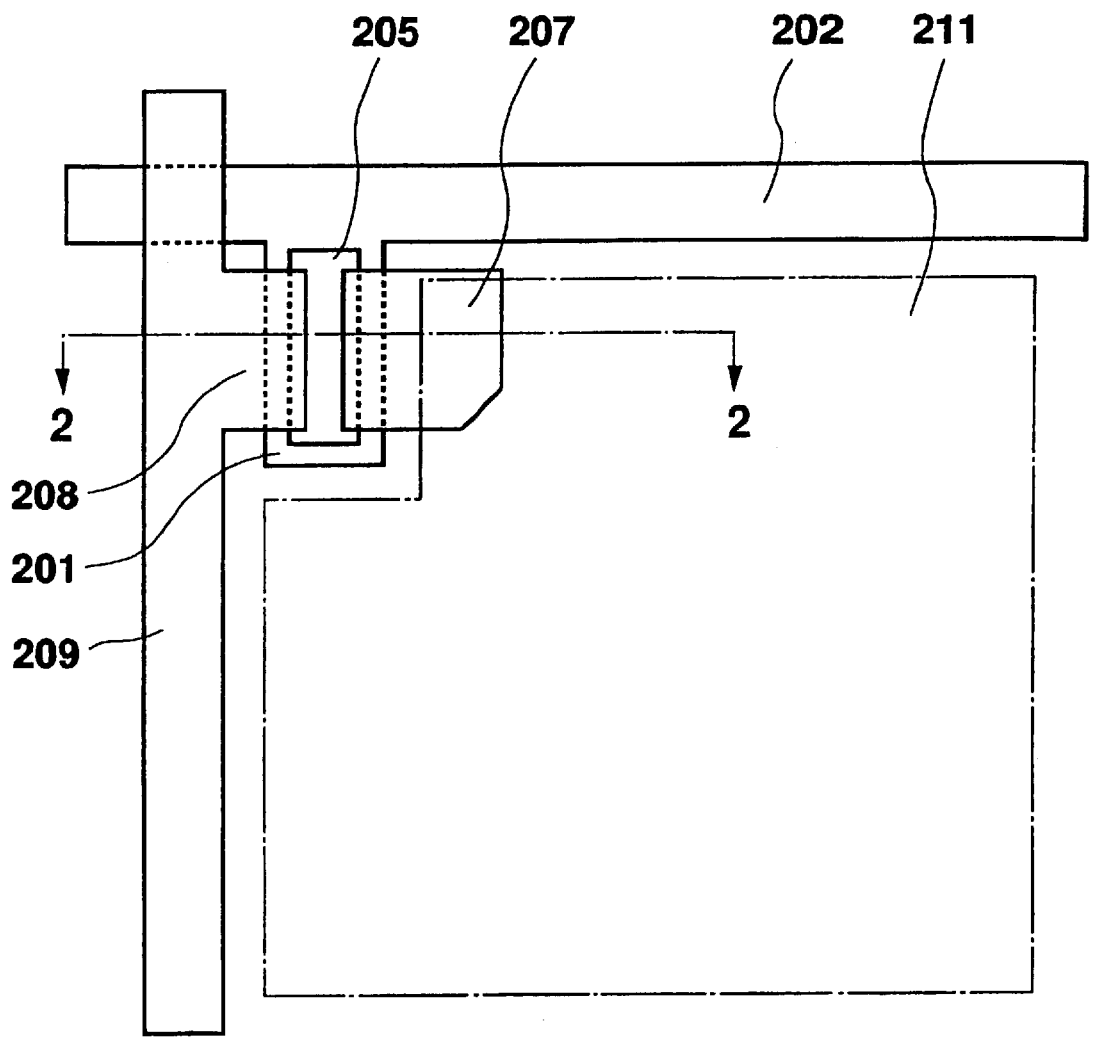
FIG. 1 is a plane view showing the structure of a unit pixel for a conventional LCD.
Figure 2:
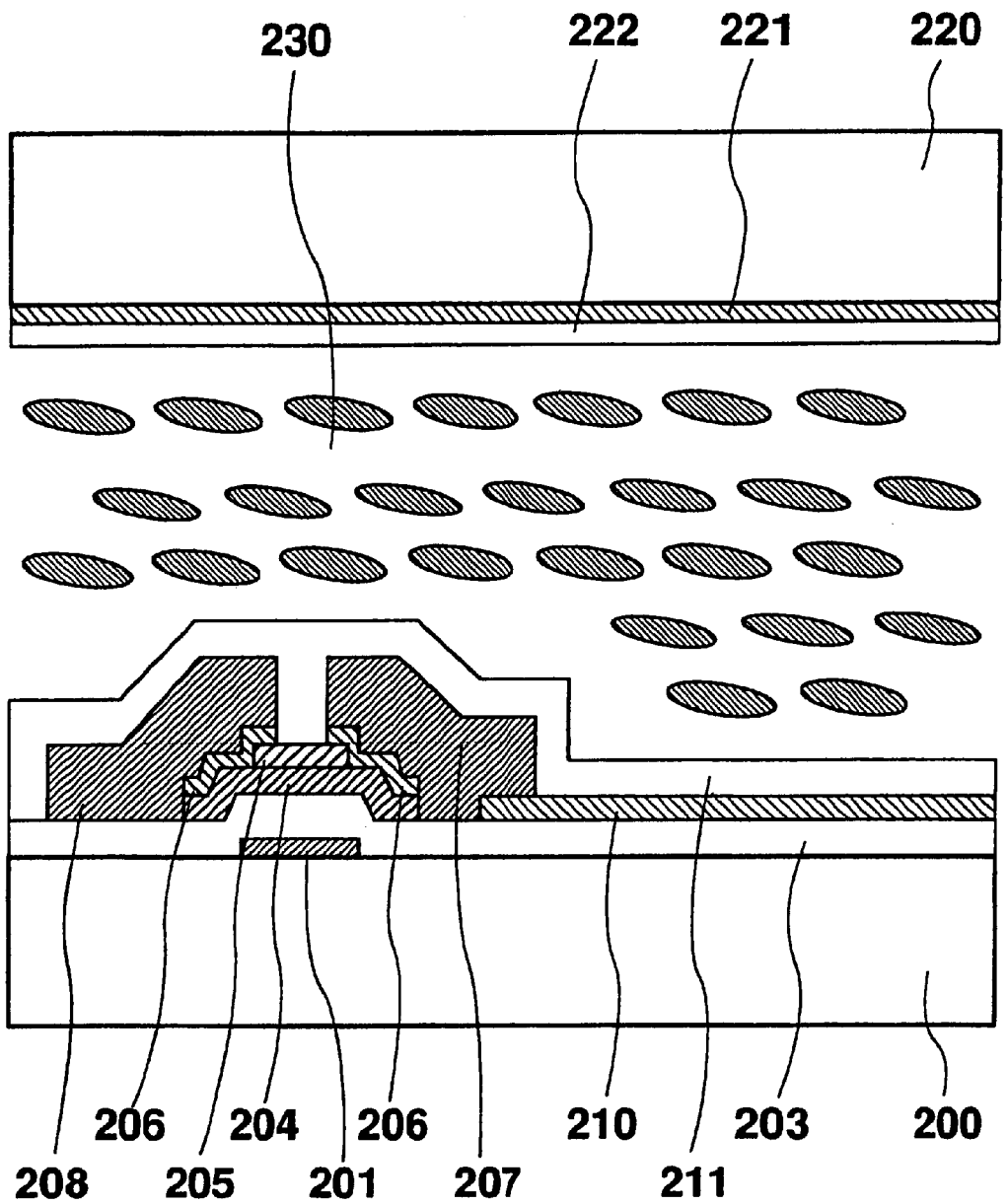
FIG. 2 is a cross-sectional view along the line F—F in FIG. 1.
Figure 3:
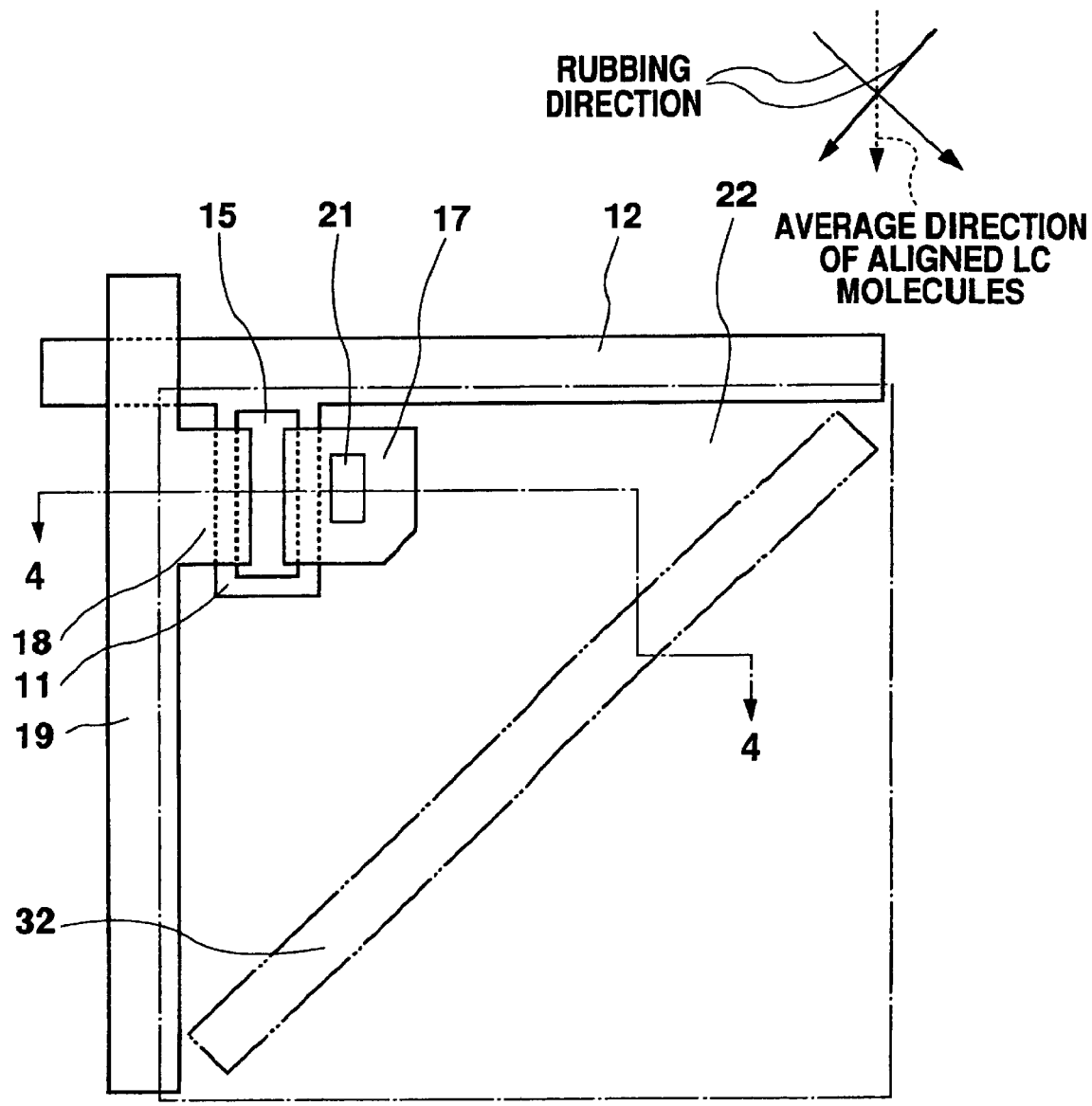
FIG. 3 is a plane view showing the structure of a unit pixel for an LCD according to a first preferred embodiment of the present invention.
Figure 4:
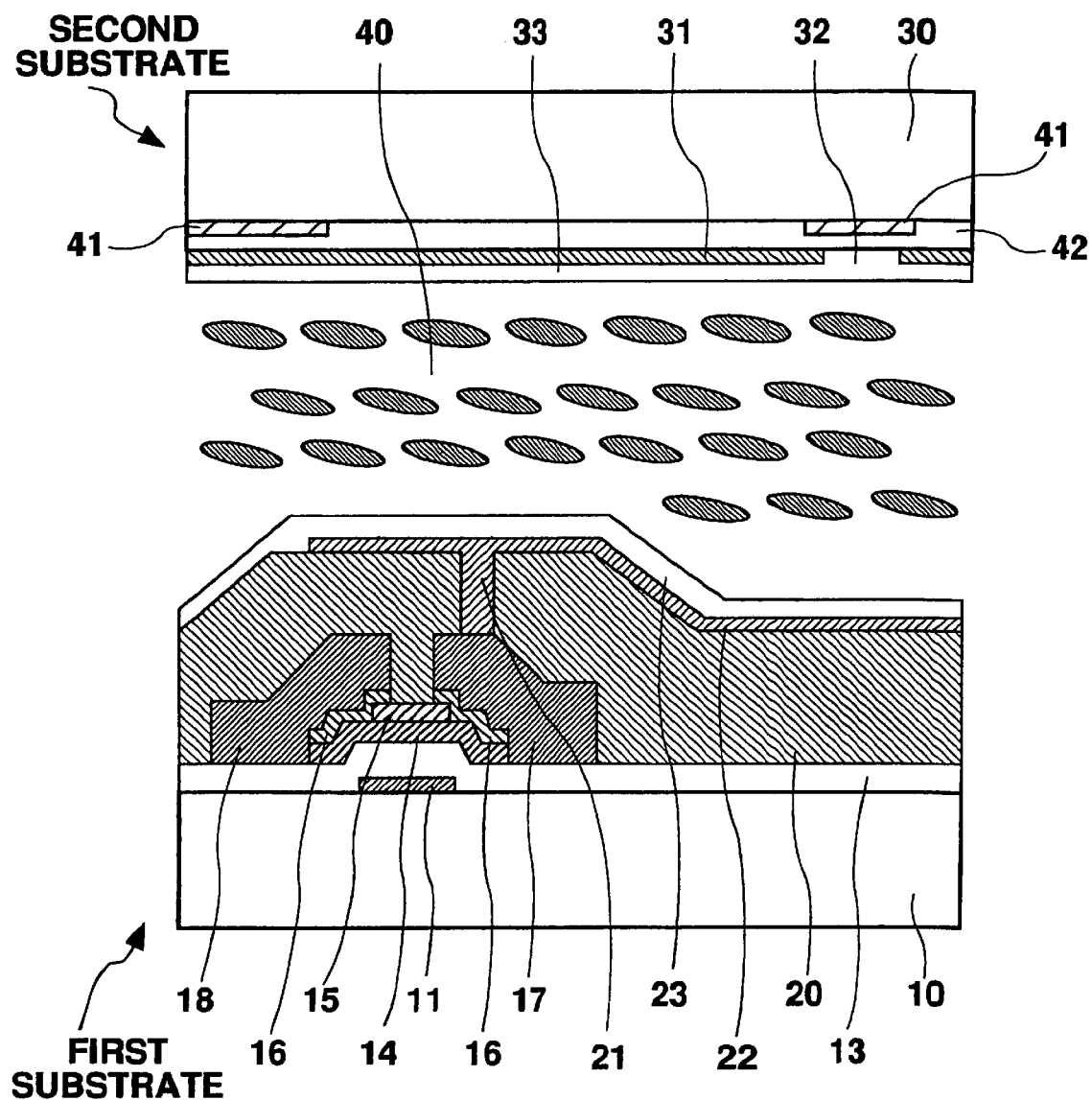
FIG. 4 is a cross-sectional view along the line A—A in FIG. 3.

FIGS. 3 and 4 show the structure of a unit pixel for an LCD according to a first embodiment of the present invention. FIG. 3 is a plane view; FIG. 4 is a cross-sectional view along the line A—A in FIG. 3. A transparent substrate 10 made of glass, etc., is provided. On substrate 10, a conductive film made of Cr, etc., is formed in a predetermined shaped to have a thickness of 1500 Å by means of etching using photo-lithography, whereby a gate electrode 11 and a gate line 12 are constituted. A gate line 12 integrally connects a row of gate electrodes 11 aligned in the same row direction. Covering the whole of substrate 10, a $Si_3N_4$ or $SiO_2$ layer is formed having a thickness of 2000 Å to 4000 Å by means of CVD to thereby constitute a gate insulation film 13. On gate insulation film 13, an a-Si layer 14 is formed in a region corresponding to gate electrode 11, so that it will act as an operating layer for the TFT. Amorphous Si regions doped with impurities are formed at both ends of a-Si layer 14 so as to obtain ohmic characteristics, forming ($N^+$a-Si) layers 16. Between a-Si layer 14 and ($N^+$a-Si) layers 16, an etching stopper 15 is formed, made of ($Si_3N_4$).

These a-Si layer 14, ($N^+$a-Si) layer 16, and etching stopper 15 are formed as follows. After gate insulation film 13 has been formed by means of CVD as mentioned above, an a-Si layer and a $Si_3N_4$ layer are successively formed thereupon in this order by means of CVD. The obtained $Si_3N_4$ layer is then etched to become an etching stopper 15. Subsequently, after a ($N^+$a-Si) layer has been formed by means of CVD on the layers already formed, the a-Si and ($N^+$a-Si) layers are collectively etched into the same shape, namely, the island-shape of a TFT. The etched a-Si and ($N^+$a-Si) layers become an a-Si layer 14 and a ($N^+$a-Si) layer 16, respectively.

Following the above, Al/Si is sputtered onto the layers formed thus far until it has an accumulated a thickness of 700/1000 Å. The obtained Al/Si layer is etched into a predetermined pattern to thereby constitute a source electrode 17 and a drain electrode 18, which are connected to respective ($N^+$a-Si) layers 16. With the above, a TFT has been constituted. In addition to the above, a drain line 19 is provided, intersecting gate line 12, for integrally connecting a column of drain electrodes 18 aligned in the same column direction.

Covering all of the above members, a $Si_3N_4$ or $SiO_2$ film having a thickness of 1 to 5 $\mu$m is formed over the entire substrate 10. This film will act as an inter-layer insulation film 20. A contact hole 21 is formed in inter-layer insulation film 20 by etching, so as to pass therethrough.

Further, a region enclosed by gate lines 12 and drain lines 19 on inter-layer insulation film 20 is sputtered with ITO, and the ITO is then etched into a pattern shown in FIG. 3, to become a pixel electrode 22. Pixel electrode 22 is connected to source electrode 17 through contact hole 21. Note that pixel electrode 22 is formed extending above drain line 19 and the TFT, having inter-layer insulation film 20 in between them.

Covering inter-layer insulation film 20 and pixel electrode 22, an alignment film 23 made of polyamide, etc., is formed. Rubbing the surface of alignment film 23 in the direction from upper right to lower left results in controlling liquid crystal molecules to have uniform initial orientation.

On a first substrate (a TFT substrate) having the above structure, a second substrate (an opposing substrate) made of transparent material, such as glass, is disposed opposing the first substrate, and a liquid crystal layer 40 is formed between the first and second substrates. On the surface of the second substrate facing the first substrate, a common electrode 31 made of ITO is formed covering most of the second substrate. A band region having no electrode formed therein is made by means of etching the common electrode 31 in the region corresponding to pixel electrode 22. This band region, constituting an orientation control window 32, spreads in the diagonal direction of the pixel. Similar to the first substrate side, the surface of the second substrate having common electrode 31 formed thereon is covered by an alignment film 33 made of polymide, etc. The surface of film 33 is also rubbed in the direction from bottom right to upper left to impart uniform initial orientation to liquid crystal molecules. Also, for an LCD in the normally-white mode, orientation control window 32 is covered by a light-shielding film 41 made of Cr, etc., on the second substrate side. A layer 41 is also provided to cover gaps between pixel electrodes 22. Covering these light-shielding layers 41, inter-layer insulation film 42 is formed, and the above mentioned common electrode 31 is formed on this inter-layer insulation film 42.

Particularly in the TN mode, rubbing directions for alignment films 23, 33 are defined so as to be orthogonal to each other, so that liquid crystal molecules are arranged twisted by 90 degrees between the two films 23, 33. The outsides of both substrates 10, 30 are covered by polarizing plates (not shown) such that polarizing light axes thereof match to respective rubbing directions.

In a pixel cell in which an orientation control window 32 is formed traversing the pixel from upper right to lower left as shown in FIG. 3, the rubbing direction for alignment film 33 on the second substrate side is defined as traversing the pixel from upper left to lower right, i.e., orthogonal to the extended line of alignment control window 32 in the longitudinal direction. With this arrangement, when voltage is applied and an electric field is thus generated in a sloped direction around the edges of orientation control window 32, liquid crystal molecules nearby will rise, moving in the shortest distance, such that one end of their long axes becomes closer to the electric field direction. In other words, respective liquid crystal molecules are inclined towards the nearest edge of the four edges of the window 32. Liquid crystal molecules are resultantly inclined in the opposite directions between both sides of the window 32.

On the first substrate side, electric fields are generated in the sloped direction around the edges of pixel electrode 22 when a voltage is applied. Due to these electric fields, liquid crystal molecules in the neighborhood of the respective edges of pixel electrode 22 rise such that their outer ends are lifted. This movement results in molecules having opposite ends lifted between the upstream side and the downstream side of the rubbing direction.

As described above, opposite ends of LC molecules are made to rise between both sides of orientation control window 32, having the window 32 as a boundary, on the second substrate side. In the liquid crystal corresponding to the window, the initial orientation of the molecules is maintained since there is a field-free region or a region around which only a week electric field is generated, wherein the weak electric field has a lower voltage that which is necessary to drive liquid crystal molecules. In other words, horizontal orientation of liquid crystal molecules becomes opposite between the two sides, so that pixel dividing is achieved. This enables a wide viewing angle. Note that regions where liquid crystal molecules rise against a pre-tilt angle imparted through rubbing are referred to as a reverse tilt domain.

As described above, in the structure shown in FIGS. 3 and 4, the orientation of liquid crystal molecules is secondarily controlled through electric fields generated in the sloped direction around the edges of pixel electrode 22 and alignment control window 32, so that pixel dividing is achieved. In particular, these electric fields are not disturbed by a voltage difference between pixel electrode 22 and gate electrode, drain electrode, and associated lines 11, 12, 18, 19 in a structure wherein the pixel electrode 22 is situated in an upper layer of the TFT having an inter-layer in between, in other words, the former is kept away from the latter. As a result, preferable pixel dividing can be achieved.

As will be understood from the above, in the structure shown in FIGS. 3 and 4, the influence on the state of display of an electrode and associated lines 11, 12, 18, 19 is determined according to the thickness of the inter-layer insulation film 20.

Figure 5:
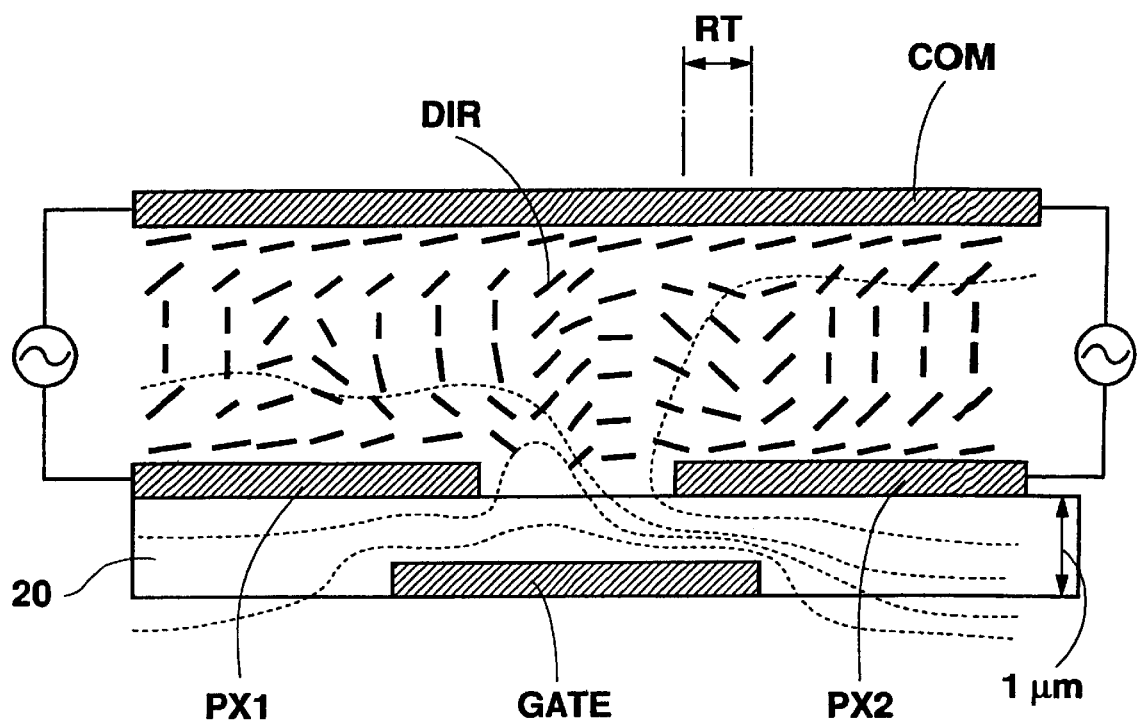
FIG. 5, FIG. 6, and FIG. 7 are cross-sectional views showing equipotential lines and orientation of liquid crystal molecules in a liquid crystal cell in the vicinity of a gate line.
Figure 6:
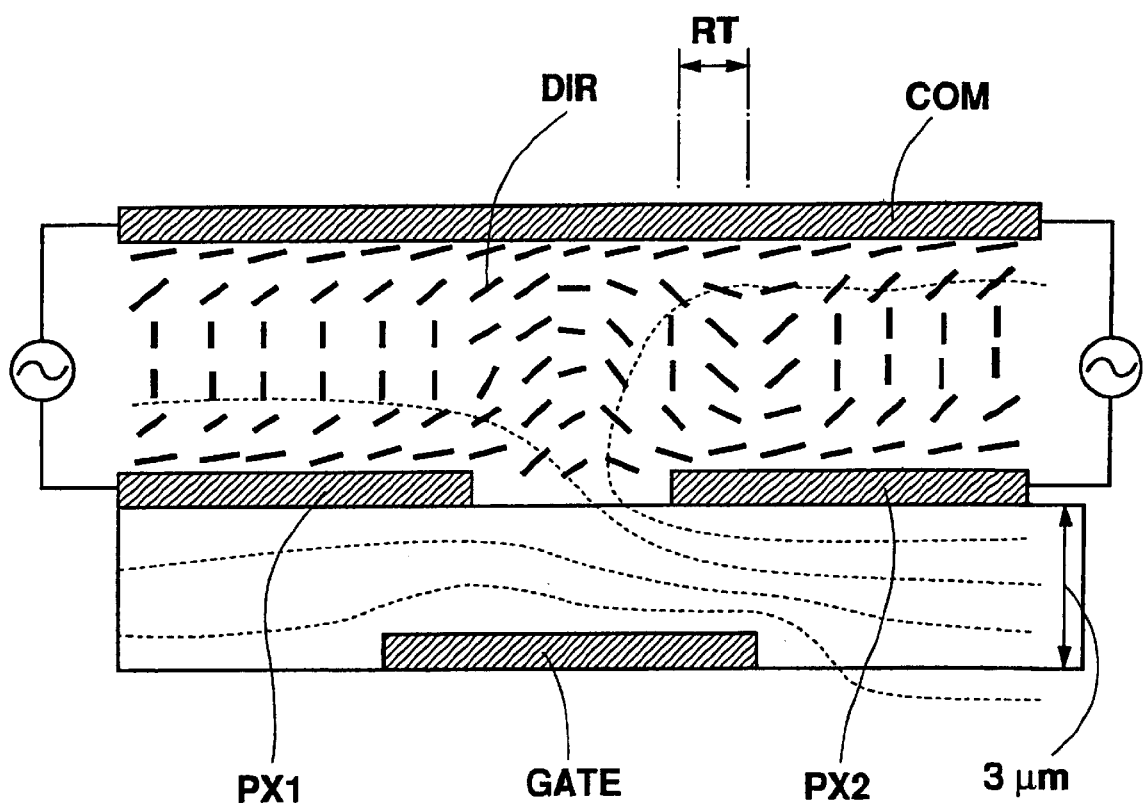
Figure 7:
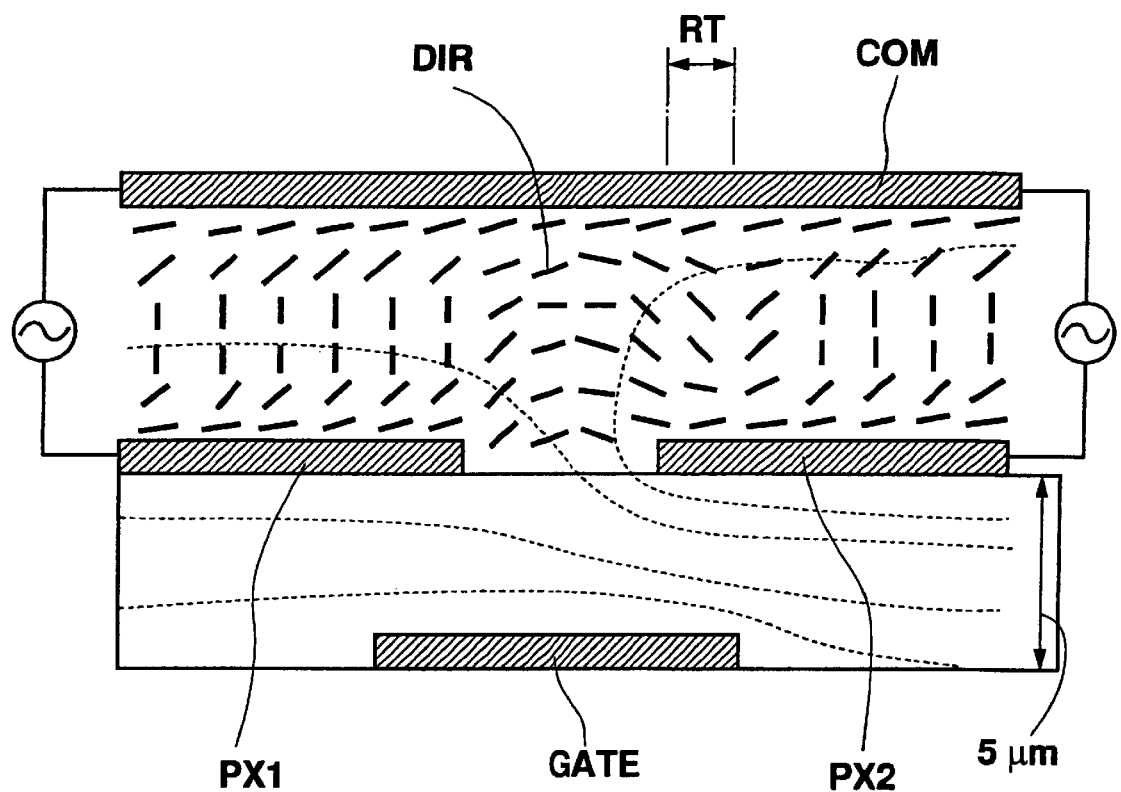

FIGS. 5 to 7 show the results of simulation as to orientation of liquid crystal molecules when the thickness α of inter-layer insulation film 20 is varied. In the drawings, equipotential lines are shown by dotted lines; aligned liquid crystal molecules are shown by a solid thick line. The orientation of liquid crystal molecules depends on the shape formed by an equipotential line. Pixel electrode (PX1) represents a pixel having an end in the vicinity of which molecules present normal orientation; pixel electrode (PX2) represents a pixel having an end in the vicinity of which a reverse tilt domain is caused. In simulation, a driving voltage is applied between common electrode (COM) and respective pixel electrodes (PX1, PX2) to put a TN phase liquid crystal layer in a driven state. The pixel electrode (PX1) is located toward one end of the gate line (GATE), while the pixel electrode (PX2) is located toward the other end of the gate line (GATE). The interval between pixel electrodes (PX1, PX2) and gate line (GATE), or an inter-layer distance ($\beta g \approx \alpha$), is varied between to be 1 μm, 3 μm, or 5 μm in the simulation. In addition, an interval between pixel electrodes (PX1, PX2) is defined as twice an inter-pixel electrodes (PX1, PX2) is defined as twice an inter-layer distance βg, that is, 2 μm, 6 μm, and 10 μm in FIGS. 5, 6, and 7, respectively. Note that, in actual fact, gate insulation film 13 intervenes between gate line 12 and pixel electrodes 22, which is, however, neglected here as its thickness is only one-tenth of the thickness α of inter-layer insulation film. In other words, the thickness α is considered to be substantially equal to an inter-layer distance ($\beta g \approx \alpha$) in the simulation.

Referring to FIG. 5, the case of a relatively small inter-layer distance βg, i.e., 1 μm, a reverse tilt domain (RT) is caused on the pixel electrode (PX2) side, and the orientation (DIR) of molecules is disturbed on the pixel electrode (PX1) side. This may be due to a large amplitude gate voltage, and electric fields generated by pixel electrodes (PX1, PX2) are thus affected by an electric field generated by the gate line (GATE).

Referring to FIG. 6, although a reverse tilt domain (RT) is still caused on the pixel electrode (PX2) side, the orientation is less disturbed on the pixel electrode (PX1) side. This may be because an electric field generated by the gate line (GATE) has less affect as the inter-layer distance βg grows larger, such as 3 μm in this example.

Referring to FIG. 7, in which the inter-layer distance βg is further widened to 5 μm, the orientation (DIR) is further less disturbed on the pixel electrode (PX1) side, though a small reverse-tilt domain (RT) is still observed on the pixel electrode (PX2) side.

Figure 8:
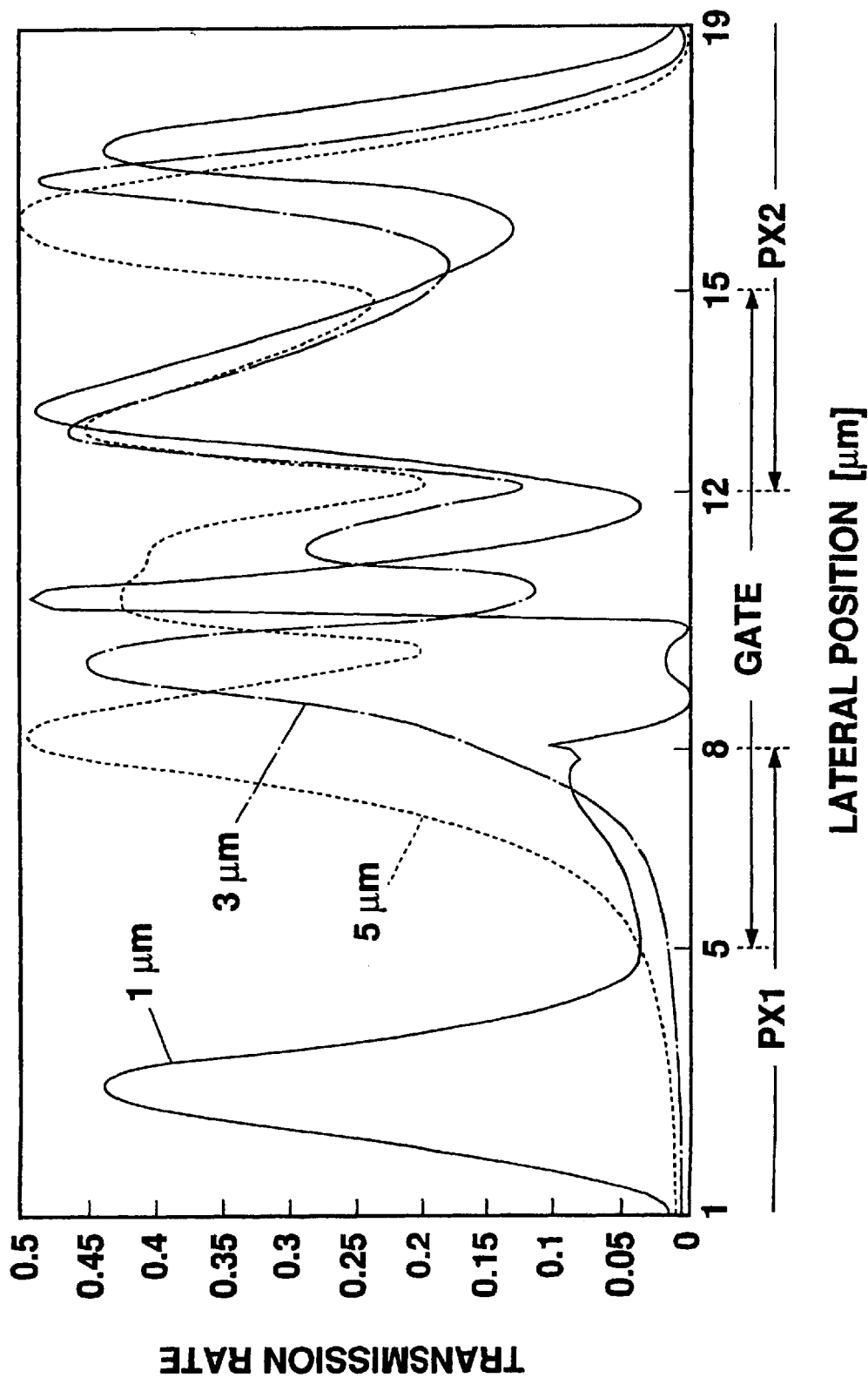
FIG. 8 shows transmission at points along the edges of pixels on a gate line side.

FIG. 8 shows transmission of a liquid crystal cell at points along the edges of pixel electrodes (PX1, PX2) and the gate line GATE when the inter-layer distance βg is 1 μm, 3 μm, or 5 μm. This result was obtained using a cell which is covered by a polarizing plate arranged in a crossed Nicols manner. A 10 μm wide gate line (GATE) overlaps pixel electrodes (PX1, PX2) at each respective ends by 3 μm. The vertical axis indicates transmission up to 0.5; the horizontal axis indicates positional relationship viewed in the direction horizontally perpendicular to the longitudinal direction of the gate line (GATE). According to this drawing, transmission peaks, for 1 μm, within regions corresponding to pixel electrodes (PX1, PX2). That is, a boundary between normal and reverse tile regions is formed in these corresponding regions, so that light goes through the liquid crystal via this boundary. In the case of 3 μm, transmission is peaks in a region corresponding to the pixel electrode (PX2) at a point on a slightly outer side of the pixel than that in the case of 1 μm. No peak is observed for pixel electrode (PX1). In the case of 5 μm, transmission is peaked in a vicinity region the edge of the pixel electrode (PX1). This region, however, is overlapped with the gate line (GATE), and the state of the display is thus not affected. In the region of the pixel electrode (PX2), transmission peaks at positions on a further outer side of the pixel than in cases of 1 μm and 3 μm. This proves less influence on the state of display.

Note that if pixel electrodes are situated apart from each other by an extent more than twice the inter-layer distance ($\beta g \approx \alpha$), an electric field generated by the gate line (GATE) will act on the liquid crystal layer via the interval distance between the pixel electrodes (PX1, PX2), creating larger influences. Simulation results will then naturally be worse. Pixel electrodes (PX1, PX2) must be positioned, separate from each other by at least 4 to 5 μm due to layout restriction or a fine processing restriction. Thus, the film thickness α of inter-later insulation film 20 is preferably set as 3 μm or more, referring to the results shown in FIGS. 6 and 7, so that pixel electrodes 22 are desirably separated by 6 μm or more accordingly.

Figure 9:
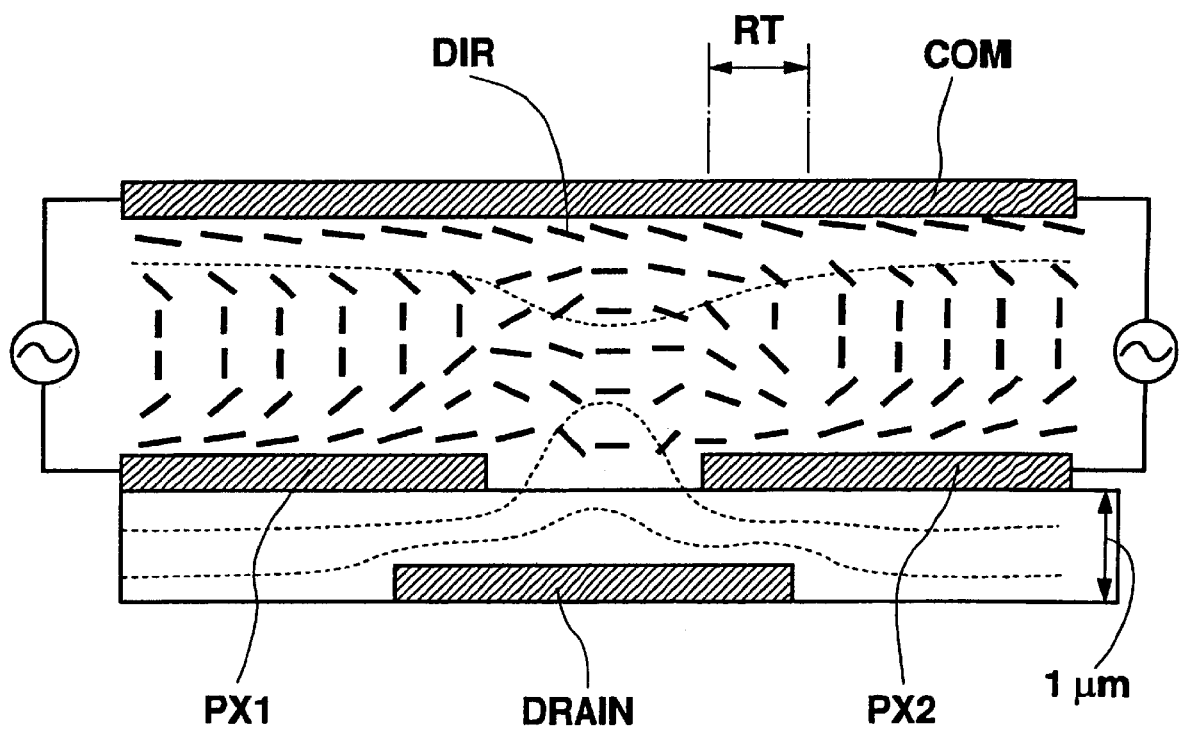
FIG. 9, FIG. 10, and FIG. 11 are cross-sectional views showing equipotential lines and orientation of liquid crystal molecules in a liquid crystal cell in the vicinity of a drain line.
Figure 10:
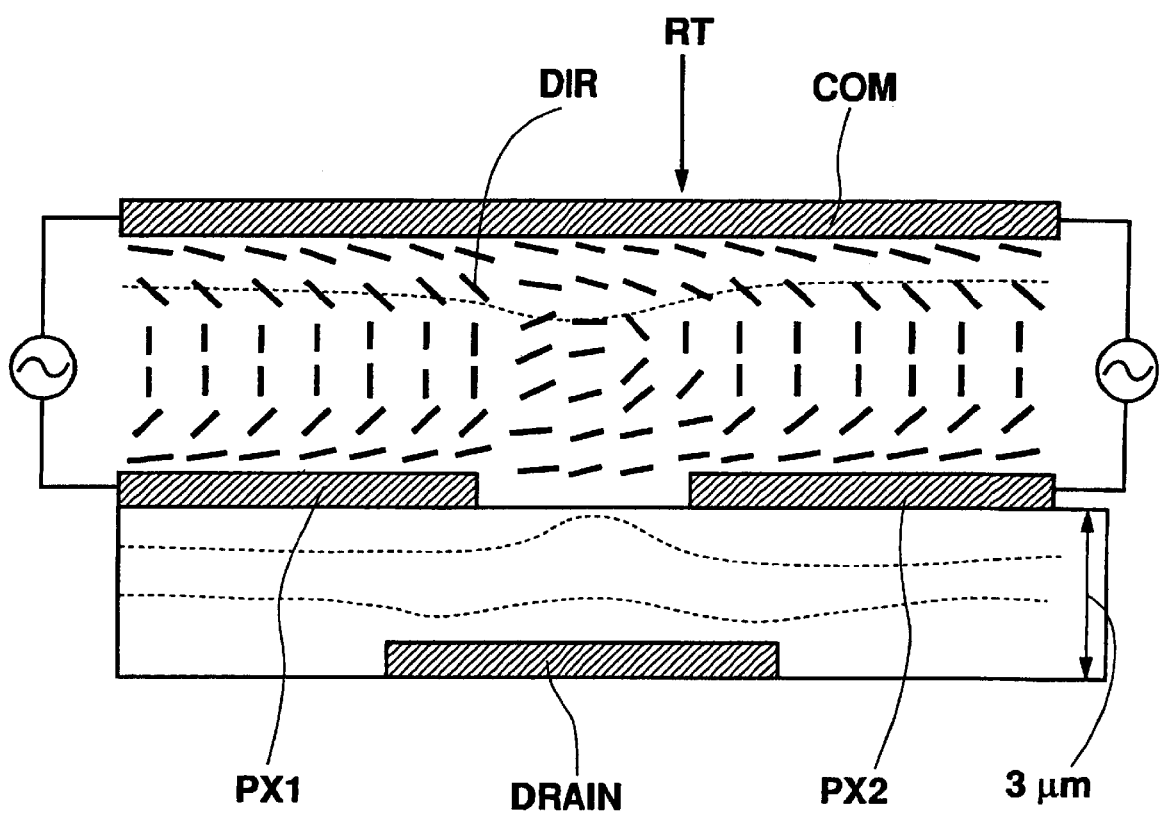
Figure 11:
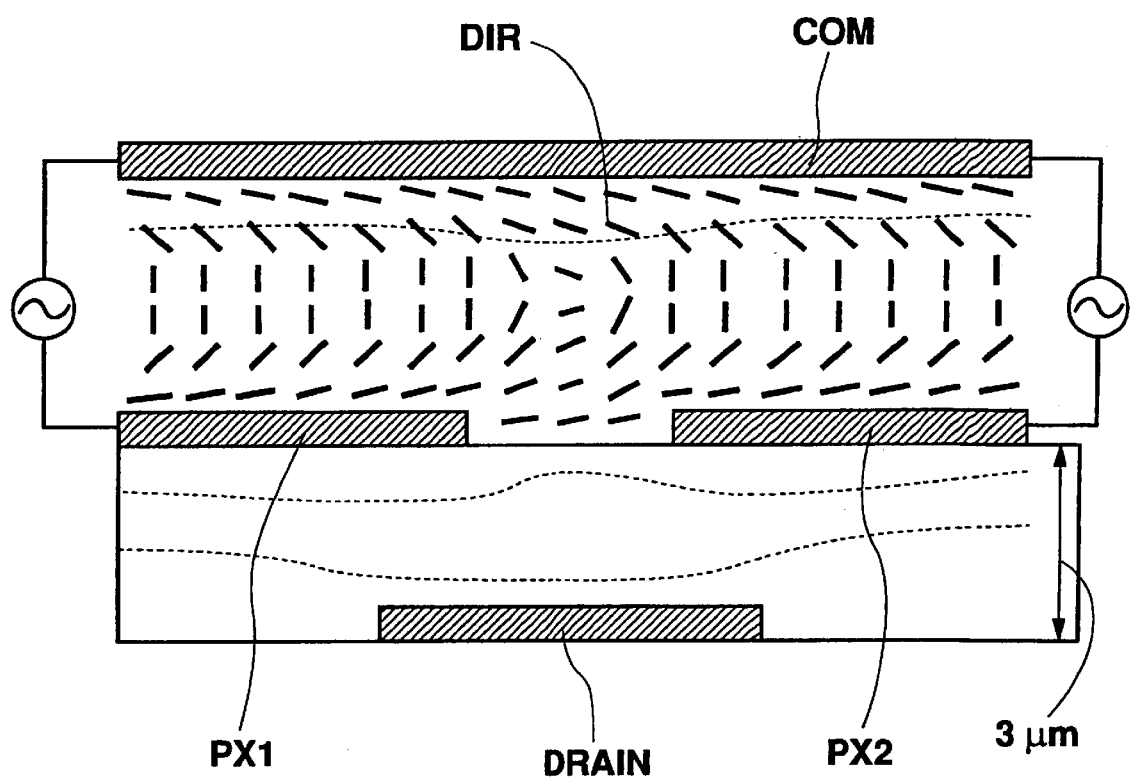

Similarly, FIGS. 9 to 11 show simulation results obtained while an inter-layer distance ($\beta g \approx \alpha$) between a drain line (DRAIN) and pixel electrodes (PX1, PX2 is changed to be 1 μm, 3 μm, or 5 μm. The pixel electrode (PX1) is located toward one end of the drain line (DRAIN), while the pixel electrode (PX2) is located toward the other side of the drain line (DRAIN). In the drawings, equipotential lines for respective cases are shown by dotted lines and liquid crystal molecules are shown by solid dashes. Orientation depends on the shape formed by equipotential lines. Pixel electrode (PX1) represents a pixel having an end in the vicinity of which molecules present normal orientation; pixel electrode (PX2) is a pixel having an end in the vicinity of which a reverse tilt domain is caused. Referring to FIG. 9, a reverse tilt domain (RT) is caused in the region corresponding to pixel electrode (PX2) due to the influence of an electric field generated by the drain line (DRAIN). However, the orientation (DIR) is not significantly disturbed in the region for pixel electrode (PX1) as the liquid crystal layer is less affected by a drain voltage with an effective value smaller than that of a gate voltage.

Referring to FIG. 10, a reverse tilt domain (RT) caused by an electric field generated by the drain line becomes smaller than that observed in FIG. 9 in the region for pixel electrode (PX2). The orientation (DIR) is not disturbed at all in the region for pixel electrode (PX1). Referring to FIG. 11, neither reverse tilt domain nor disturbance in orientation is recognized in the regions for pixel electrodes (PX1, PX2).

Figure 12:
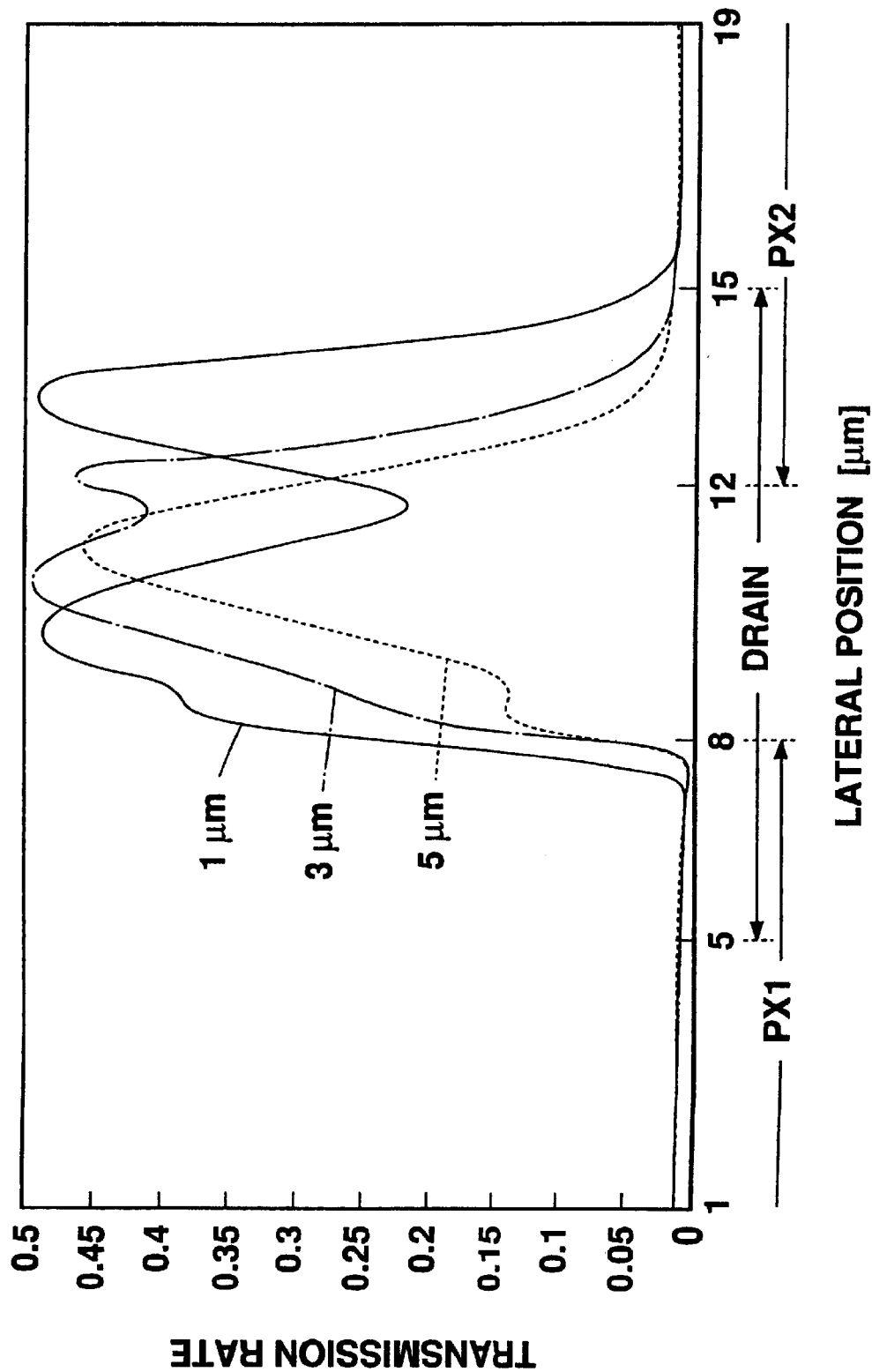
FIG. 12 shows transmission rate at points along the edges of pixels on a drain line side.

FIG. 12 shows transmission of a liquid crystal cell at points along the edges of pixel electrodes (PX1, PX2) and the drain line (DRAIN) when an inter-layer distance ($\beta$g) is 1 $\mu$m, 3 $\mu$m, and 5 $\mu$m. The vertical axis indicates transmission up to 0.5; the horizontal axis indicates positional relationship viewed in the direction vertical to the longitudinal direction of the drain line (DRAIN). For 1 $\mu$m, transmission peaks in a region corresponding to pixel electrode (PX2), most of which is overlaps the drain line (DRAIN). For 3 $\mu$m and 5 $\mu$m, a region where a peak is observed on the pixel electrode (PX2) side completely overlaps with the drain line (DRAIN), and the state of display is thus not affected at all, as light having transmitted therethrough is cut-off by the drain line (DRAIN). On the pixel electrode (PX1) side, a position for peaked transmission completely overlaps the drain line (DRAIN), and the state of display is thus not adversely affected.

Based on the above, it may be concluded that a structure having an inter-later insulation film 20 of 1 $\mu$m or more thick, particularly on a gate line side, is effective in obtaining a normal tilt region, as well as in leaving a reverse tilt region caused by electric fields generated in the sloped direction around the edge of a pixel electrode. To be specific, when an interval between a pixel electrode 22 and a gate electrode and associated lines 11, 12 can be kept sufficiently long by employing an inter-layer insulation film 20 having thickness as above, liquid crystal molecules can be protected against disturbance to their orientation due to the influence of a gate voltage, securing a normal tilt region, and in addition, orientation control can be effectively performed around the edges of pixel electrode 22 through a diagonal electric field, leaving a reverse tile region. Further, when an orientation control window 32 is formed in common electrode 31, as shown in FIGS. 3 and 4, and electric fields in the sloped direction are generated also thereabout, a reverse tilt domain is formed extending to orientation control window 32 in cooperation between controls around the edges of pixel electrode 22 on a gate line 12 side, and those inside a pixel region around orientation control window 32. As a result, the orientation of liquid crystal molecules differs between both sides of orientation control window 32 (for instance, upper left and lower right sides of the window 32 in FIG. 3). As described above, pixel electrode and a TFT and associated electrode lines, when separated in the direction of the film thickness, allow effective orientation control around the edges of the pixel electrode. As a result, the orientation of liquid crystal molecules along the edges of a pixel electrode which are perpendicular to the average of the directions in which respective molecules are aligned can be easily controlled. Further, orientation control effected from both edges of a pixel electrode (22) on gate line sides is gradually taken over by controls effective around an orientation control window 32, as the window goes into the inner side of a pixel cell, until the boundary of different orientation is finally defined on the orientation control window. In this way, preferable pixel dividing is achieved. Note that an inter-layer insulation film 20 having a thickness of 0.5 $\mu$m or more, instead of 1 $\mu$m as mentioned above, can similarly avoid disturbance to the orientation of liquid crystal molecules due to a gate voltage.

In this embodiment, pixel electrode 22 is formed extending to a gate electrode 11, a drain electrode 18, and associated lines 12, 19. This structure allows securing a maximum display region within a region defined by respective electrodes and associated lines 11, 12, 18, 19, thereby significantly increasing an aperture ratio. A long inter-layer distance between pixel electrode 22 and gate and drain lines 11, 19 allows provision of pixel electrode 22 extending to those lines while the electric field in the liquid crystal layer is not affected by the electric fields generated by those lines. Actual experimental results obtained showed a greater than 10% improvement in aperture ratio, compared to the prior art when using the above structure.

Embodiment 2

Figure 13:
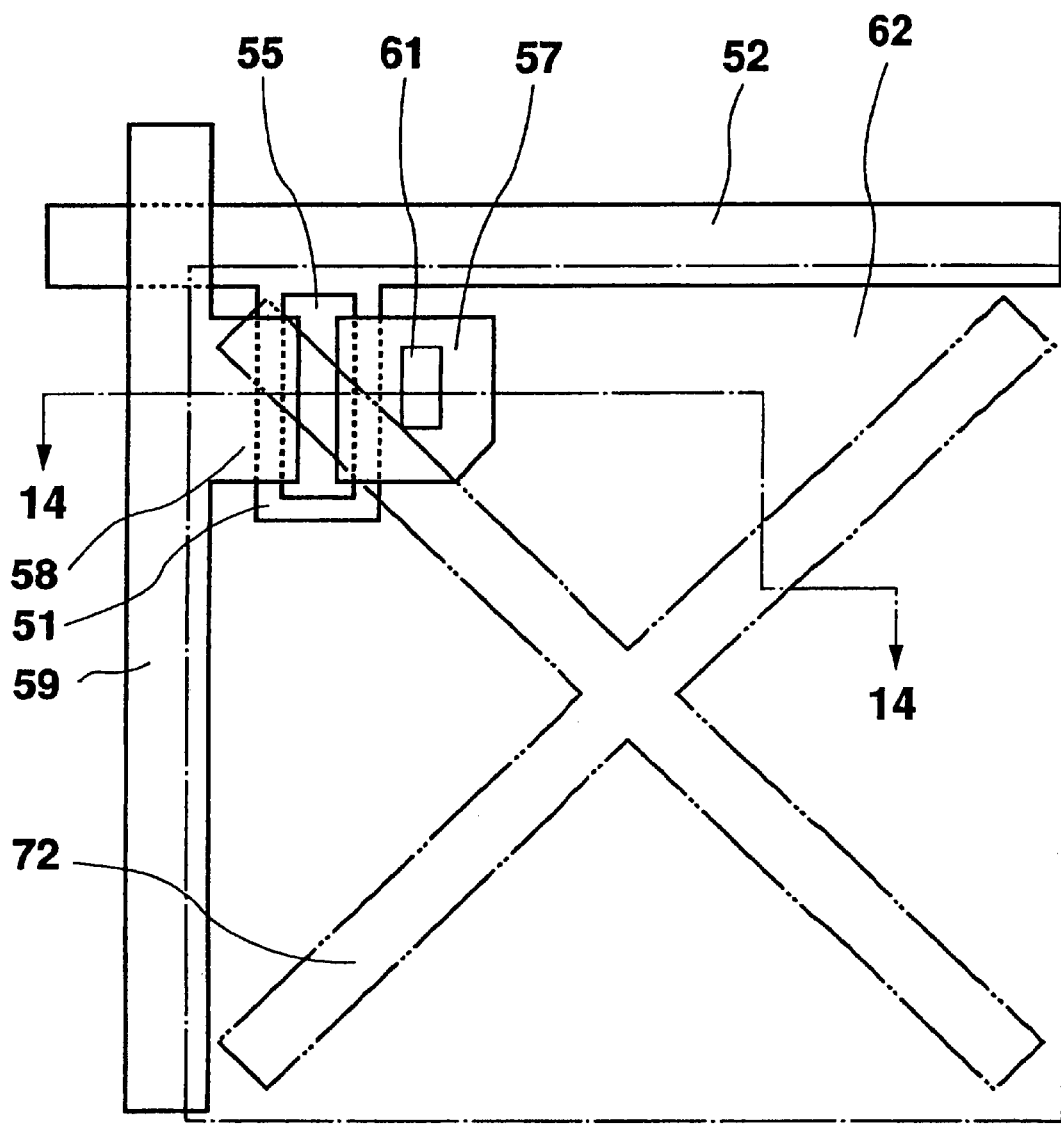
FIG. 13 is a plane view showing the structure of a unit pixel for an LCD according to a second preferred embodiment of the present invention.
Figure 14:
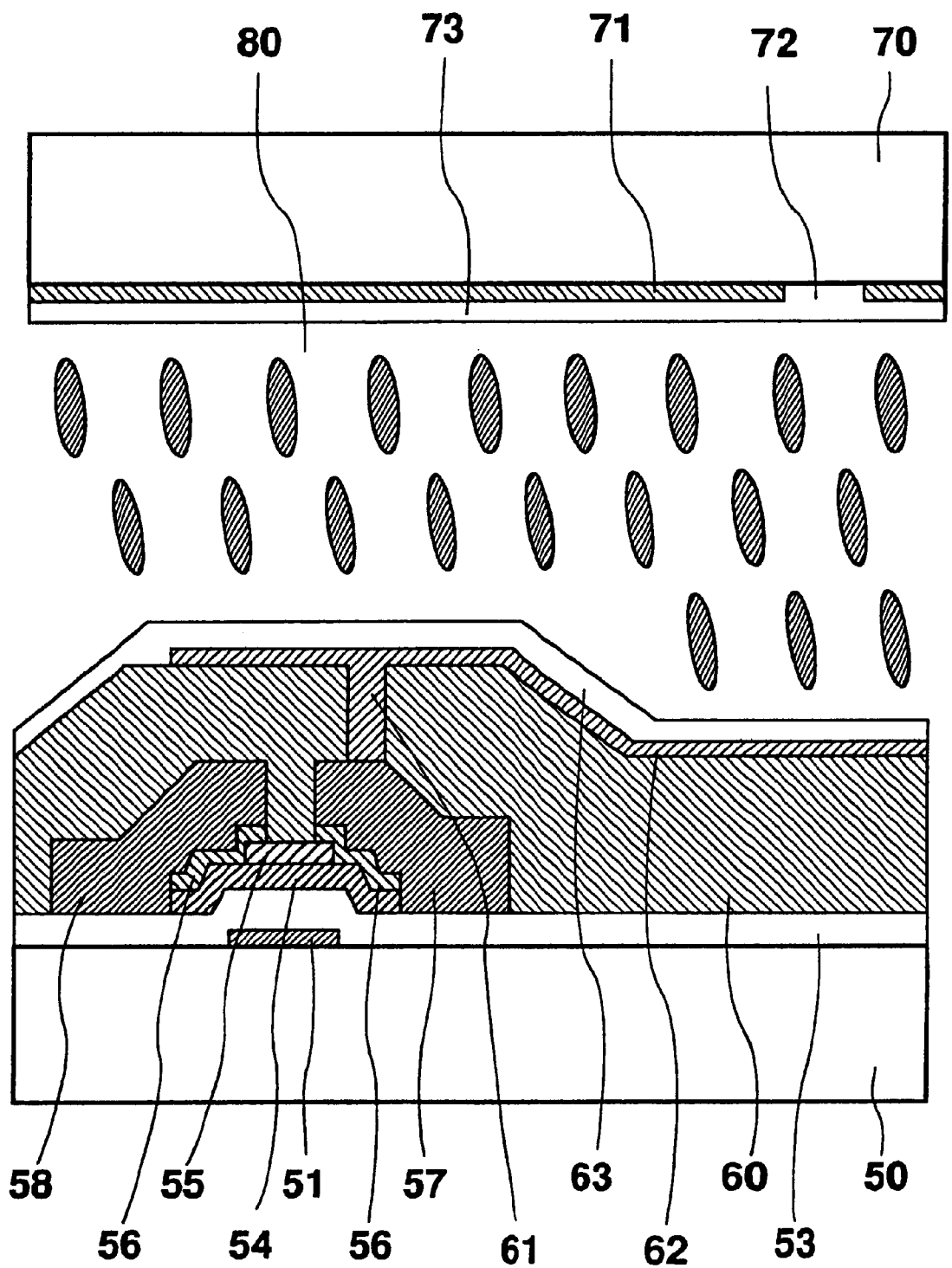
FIG. 14 is a cross-sectional view along the line A—A in FIG. 13.

FIGS. 13 and 14 show a structure of a unit pixel for an LCD according to a second preferred embodiment of the present invention. FIG. 13 is a plane view; FIG. 14 is a cross-sectional view along the line B—B in FIG. 13. Electrode arrangement is almost the same as that in the first embodiment. That is, a TFT substrate first substrate comprises a substrate 50, a gate electrode 51, a gate insulation film 53, an a-Si layer 54, an etching stopper 55, an (N$^+$a-Si) layer 56, and a source and drain electrode 57/58, which are layered on the substrate 50 in that order; gate and drain electrodes 51, 58 are formed integral to respective gate and drain lines 52, 59; an inter-layer insulation film 60 is formed covering the TFT and associated respective electrode lines; a pixel electrode 62 is formed on inter-layer insulation film 60, connecting to source electrode 57 via a contact hole 61. An opposing substrate (second substrate) comprising glass substrate 70 is provided opposing to the TFT substrate with a liquid crystal layer 80 there between; a common electrode is formed on glass substrate 70; and an orientation control window 72 is formed in common electrode 71. In this example, a DAP-type LCD is used, in which the liquid crystal is in a nematic phase having negative dielectric constant anisotropy, and vertical alignment layers 63, 73 are formed on the surfaces of respective substrates. Orientation control window 72 is formed in a shape, substantially along diagonal lines of the pixel.

Figure 15:
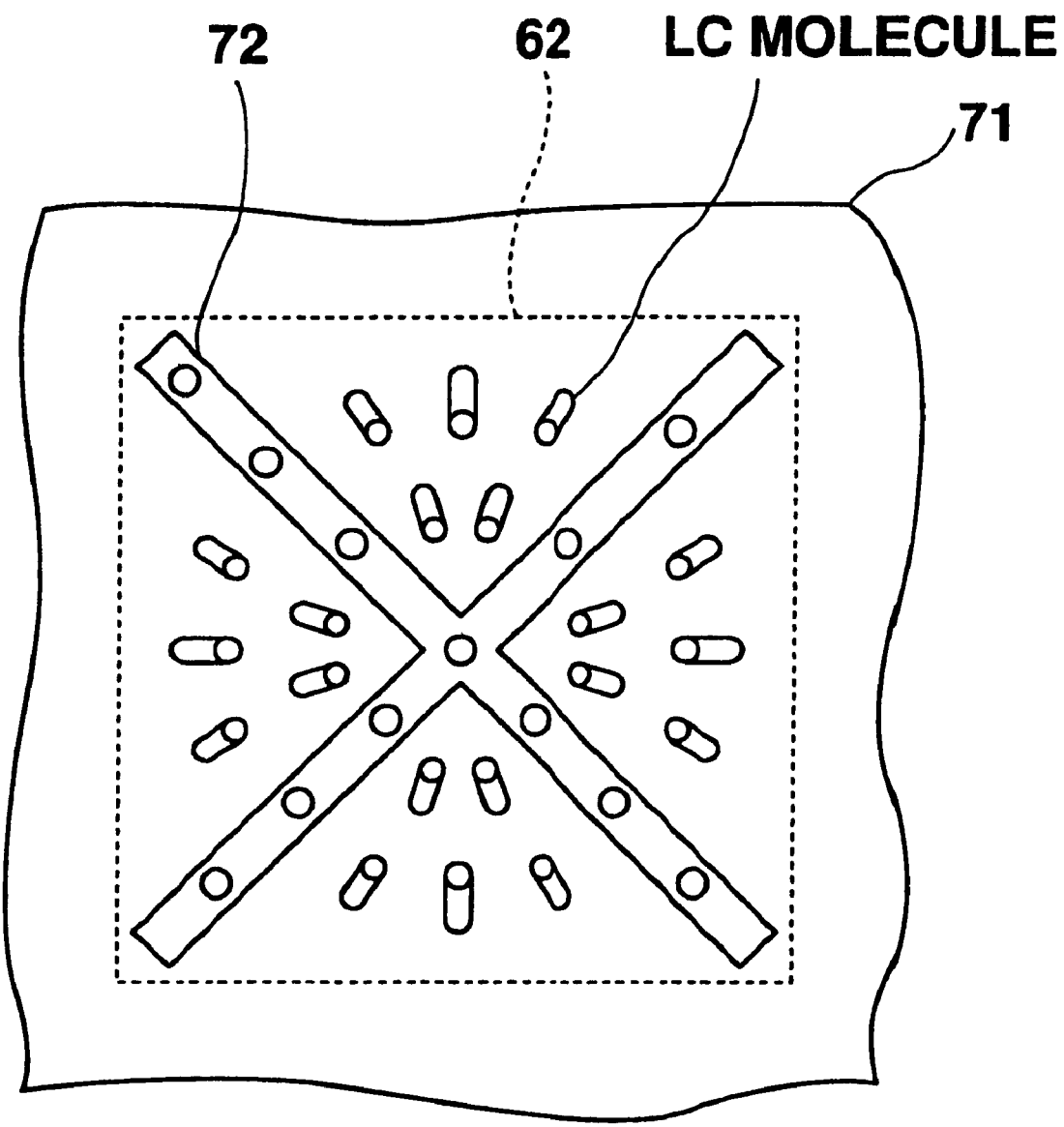
FIG. 15 shows approximate orientation of liquid crystal molecules in a driven state within one unit pixel having the structure shown in FIG. 13.

Based on a similar analysis as that made for the first embodiment, this embodiment is characterized by application of an inter-layer insulation film 60 having a thickness of at least 0.5 $\mu$m, and preferably 1 $\mu$m or more. Separated by this film 60, pixel electrode 62 is positioned away from a TFT and associated electrode lines, having a sufficient distance in between. The orientation of liquid crystal molecules is less affected by the influence of electric fields generated by the TFT and associated lines, and therefore less disturbed. As a result, orientation control can effectively be performed around the edges of pixel electrode 62 and orientation control window 72. More specifically, as conceptually shown in FIG. 15, the horizontal orientations of liquid crystal molecules are designated in the regions along the edges of respective pixels through sloped electric fields generated thereabout, and this designation is gradually made through electric fields generated around orientation control window 72 as it goes into an inner side of the pixel until a boundary of different orientation is fixedly defined on orientation control window 72. As a result, constant and preferable pixel dividing over the entire pixel is achieved, which enables a wider angle of visibility.

Embodiment 3

Figure 16:
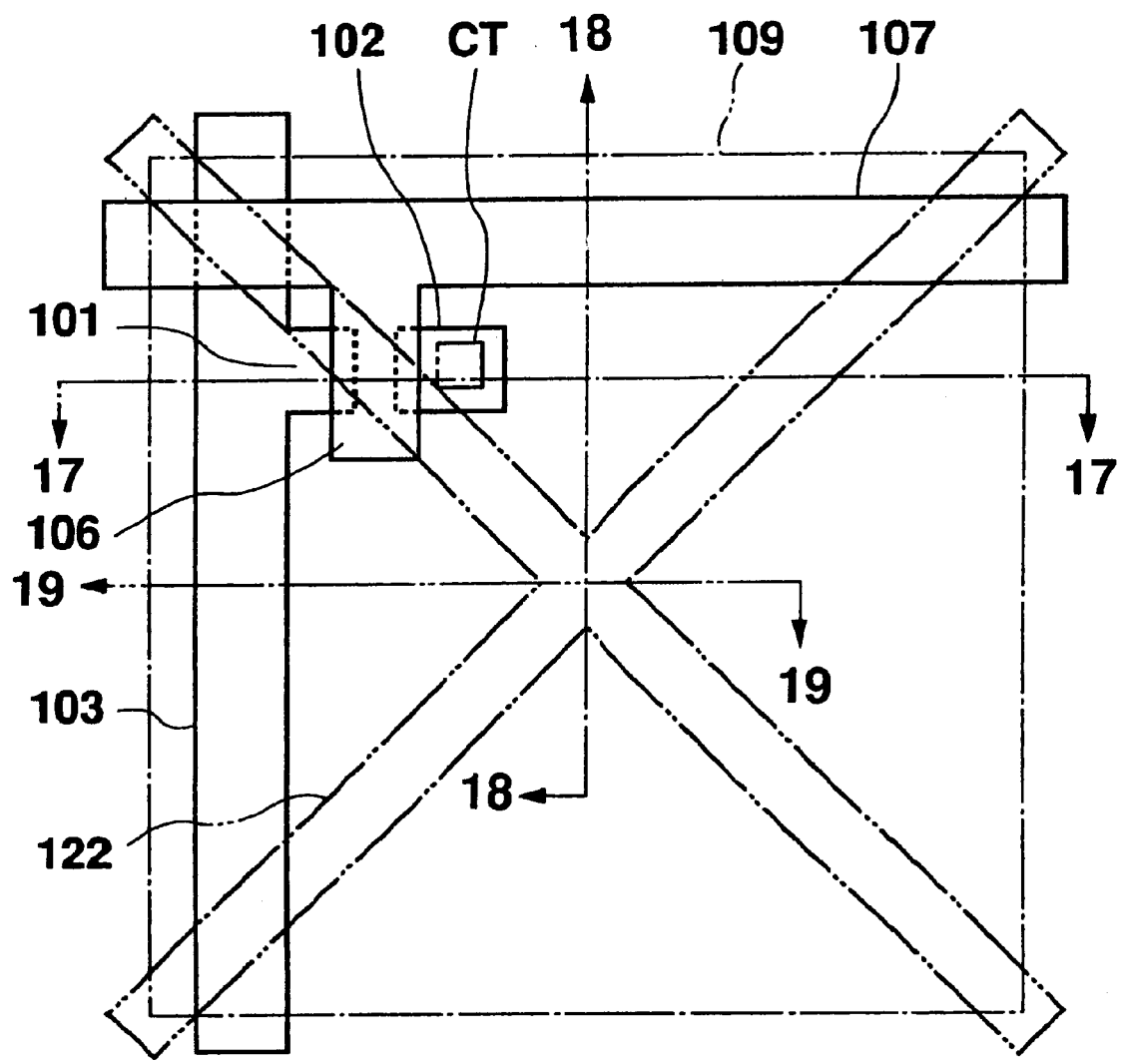
FIG. 16 is a plane view showing the structure of a unit pixel for an LCD according to a third preferred embodiment of the present invention.
Figure 17:
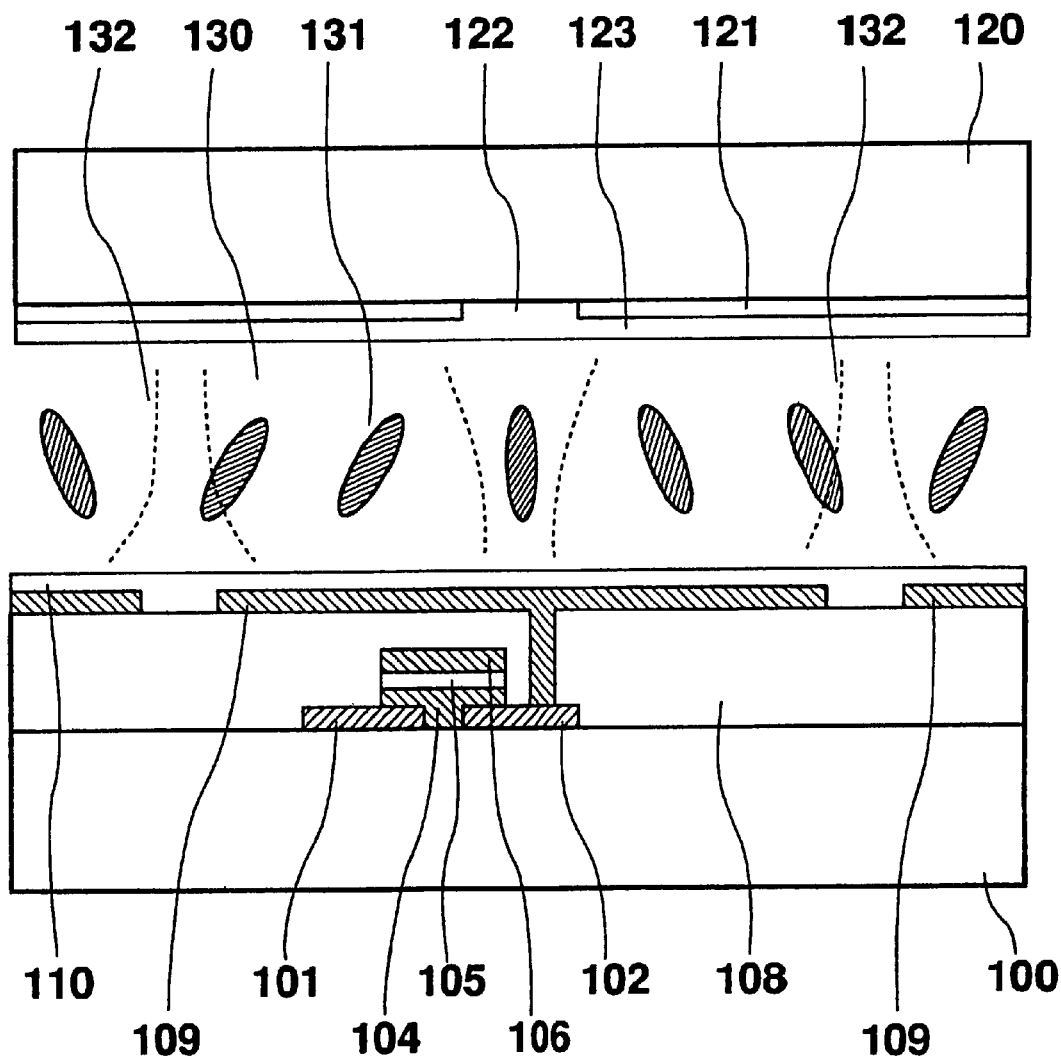
FIG. 17 is a cross-sectional view along the line C—C in FIG. 13.
Figure 18:
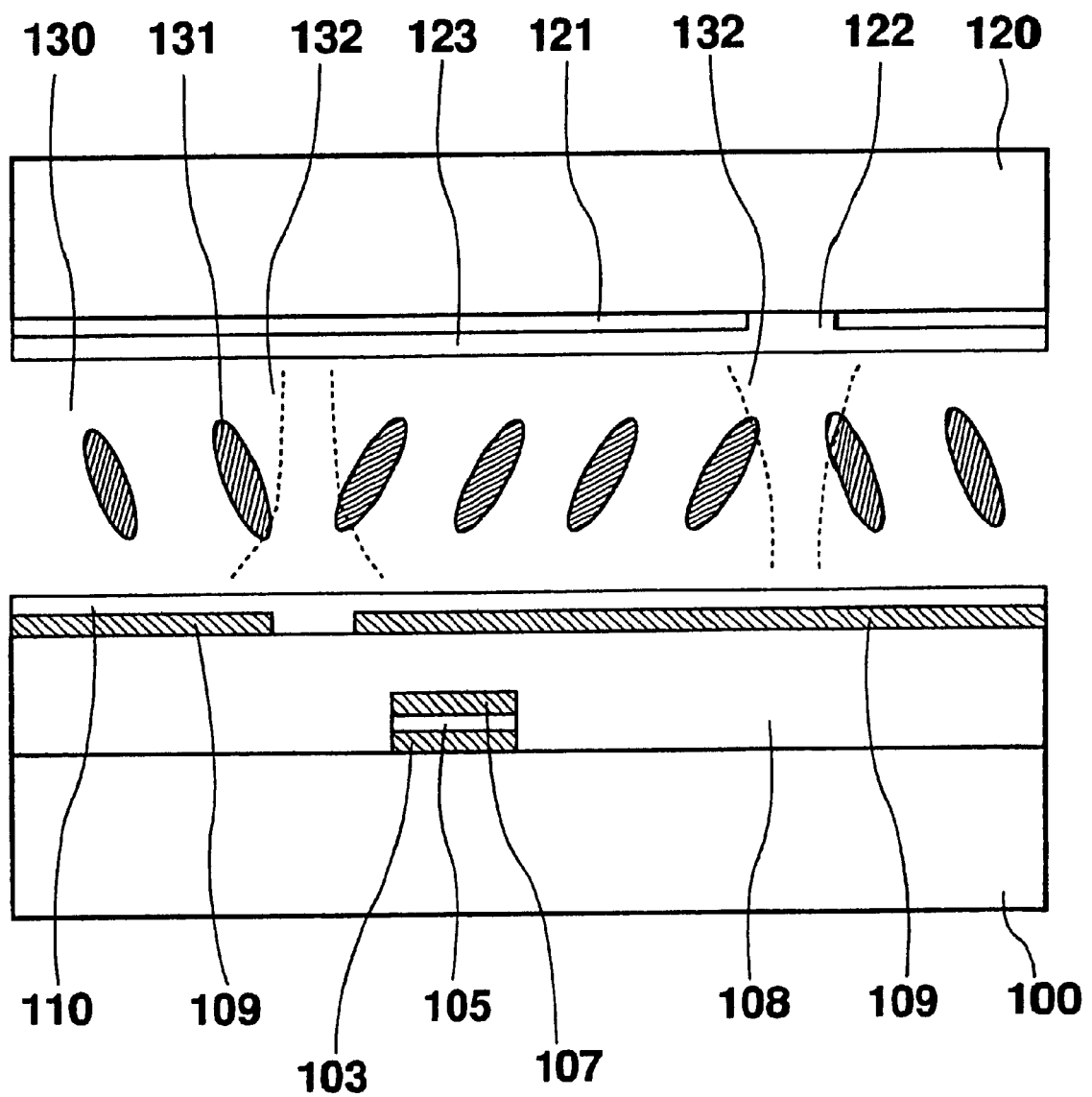
FIG. 18 is a cross-sectional view along the line D—D in FIG. 13.
Figure 19:
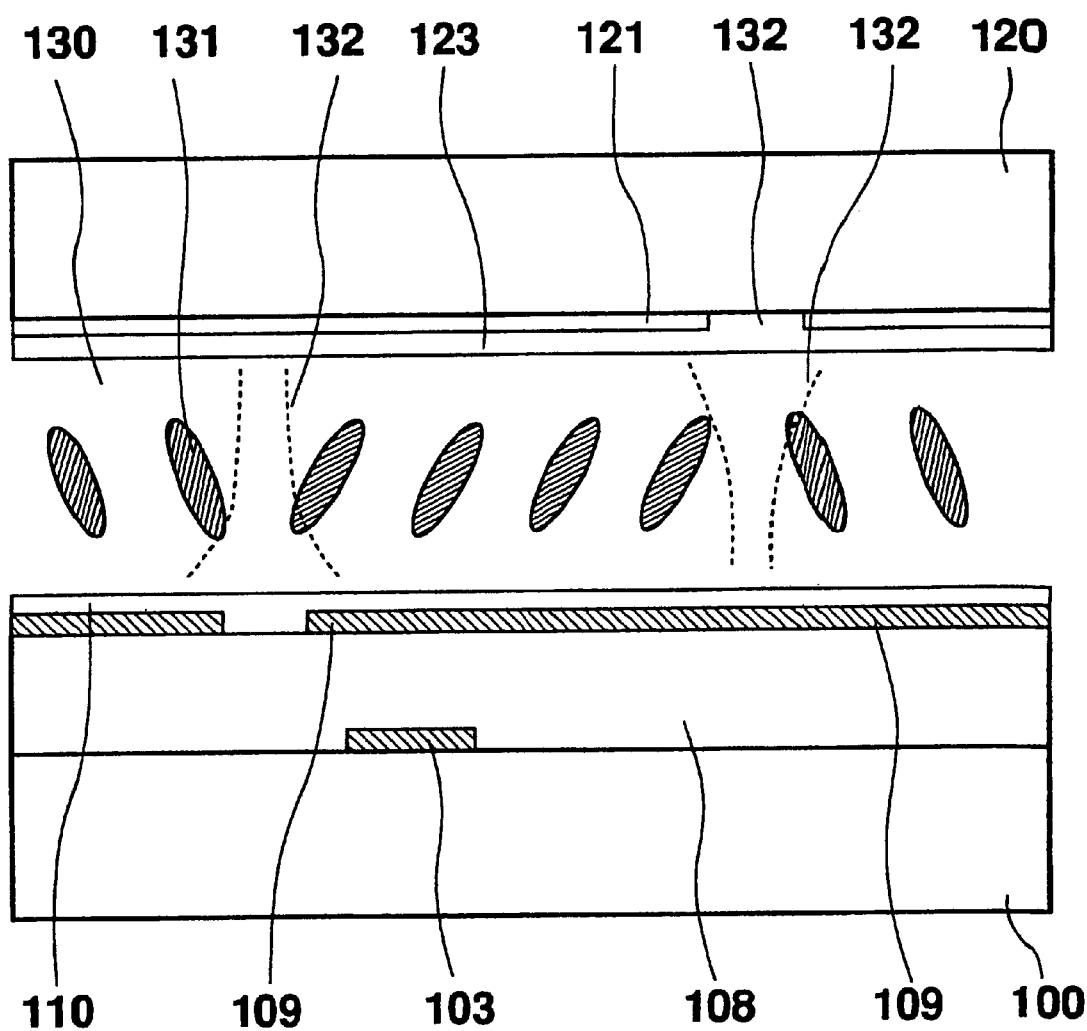
FIG. 19 is a cross-sectional view along the line E—E in FIG. 13.

FIGS. 16, 17, 18, and 19 show the structure of a unit pixel for an LCD according to a third preferred embodiment of the present invention. FIG. 16 is a plane view and FIGS. 17, 18, and 19 are respective cross-sectional views along the lines C—C, D—D, and E—E in FIG. 16. In this embodiment, on a substrate 100, a drain electrode 101, a source electrode 102, and a drain line 103 all made of a low resistive metal, such as, Cr, Al, Ta, ITO are formed. Drain electrode 101 and drain line 103 are integrally formed. Above these, an a-Si layer 104 and a gate insulation film 105 are formed in this sequence, forming a gate line 107 made of Al, etc. A part of gate line 107 constitutes a gate electrode 106, which is disposed on the drain electrode 101 and source electrode 102. These together constitute a TFT. Covering the TFT and associated electrode lines, an inter-layer insulation film 108 is provided, with a contact hole CT formed throughout. This film 108 is made of material having planation characteristic, such as SOG (spin on glass), BPSG (borophospho silicate glass), etc. On inter-layer insulation film 108, a pixel electrode 109 is formed using a conductive light-reflecting material, such as Al, which is connected to source electrode 102 via contact hole CT. The entire surface of pixel electrode 109 is covered by a vertical alignment film 110 of a polyamide or the like.

Above the film 110, a liquid crystal layer 130 is provided, with a common electrode 121, made of ITO, further provided on the layer 130. In common electrode 121, an orientation control window 122 is made having no ITO electrodes formed therein. Common electrode 121 is formed on a transparent substrate 120, and a vertical alignment film 123, made of polyamide, etc., is formed on the common electrode 121 so as to cover almost all the substrate 120.

In this embodiment, the employed LCD is a DAP-type, in which the liquid crystal has negative dielectric constant anisotropy. Its liquid crystal molecules 131 are controlled so as to have initial orientation in the ordinary direction of the substrate plane. This LCD, at the same time, is a reflection-type which employs a reflector electrode for a pixel electrode 109. As a reflection-type LCD requires a flat pixel electrode 109, a planation insulation film is used for inter-layer insulation film, which is a base for pixel electrode 109. Although a stagger-type TFT is employed here, in which gate electrode 106 is placed up an a-Si layer to ensure reduced entire height of the TFT, it is not limited to this type, and a reversed stagger type may also be used.

Similar to the first and second examples, a wide viewing angle can be secured in this example through controls on liquid crystal molecules through sloped electric fields generated around the edges of pixel electrode 109 and weak electric fields generated around the edges of orientation control window 122.

In the third embodiment, as shown in FIGS. 16 to 19, the TFT, associated electrode, and lines, 101, 102, 103, 106, 107 are situated below pixel electrode 109, which almost fully covers them. This arrangement is effective in preventing uncontrolled electric fields generated by these electrodes and lines from affecting liquid crystal layer 130, resulting disturbance to the liquid crystal molecule orientation. Therefore, a large vertical distance is not required between pixel electrode 109 and electrode lines in this arrangement, so that the problems stemming from use of a thick inter-layer insulation film 108, including a decreased throughput and increased contact resistance between pixel electrode 109 and source electrode 102, can be solved.

Figure 20:
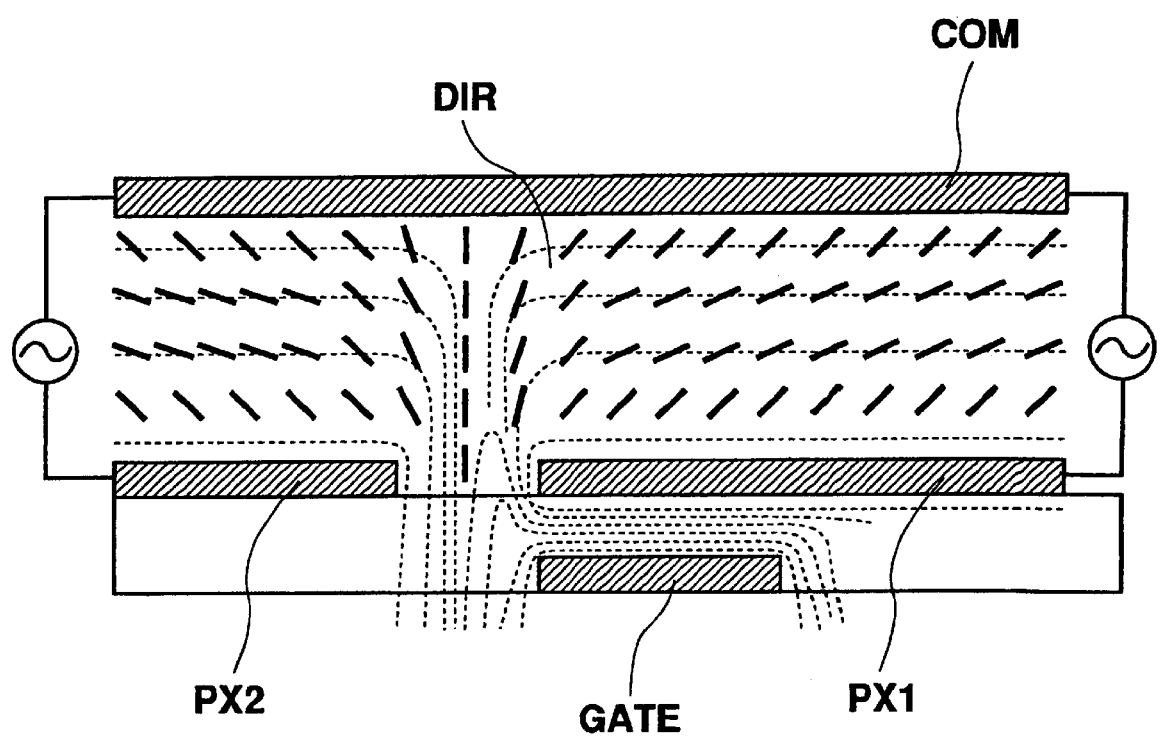
FIG. 20 is a cross-sectional view showing equipotential lines and orientation of liquid crystal molecules in a liquid crystal cell.

In this way, the amplitude of a signal and the strength of electric field generated are longer and stronger on the gate line side than on the drain line side. That is, liquid crystal is more disturbed on the gate line side. In order to reduce such disturbance on the gate line side, a gate line (GATE) is situated below the pixel electrode (PX1) with an inter-layer insulation film in between such that one end of the gate line (GATE) is positioned matched to that of the pixel electrode (PX1). FIG. 20 shows the result of simulation obtained using this structure, wherein a dotted line represents an equipotential line, and solid dashes represents a liquid crystal molecules. In this structure, the thickness of an inter-layer insulation, i.e., an inter-layer distance ($\beta g$) between a pixel electrode (PX1) and a gate line (GATE), is considered less than 1 $\mu$m, in this case, around 0.5 $\mu$m. This value is interpolated from the fact that, given an inter-layer insulation film 108 is 1.0 $\mu$m thick, the total film thickness of the TFT (see FIG. 17) or that of gate line 107, an a-Si layer 103, and a gate insulation film 105 (see FIG. 18) are each around 0.5 $\mu$m. Despite the small inter-layer distance $\beta g$, the orientation of liquid crystal molecules within a pixel region is not adversely affected, though some distortion is recognized in equipotential lines. In general, preferable orientation control is achieved here.

Further, experience shows that the orientation of liquid crystal molecules is not affected by an electric field generated by a gate line (GATE) which is situated having one end projected from a region corresponding to pixel electrode (PX1) by an extent y, wherein the extent y is equal to or less than a half of an inter-layer distance or an interval between pixel electrodes (PX1, PX2).

Embodiment 4

Figure 21:
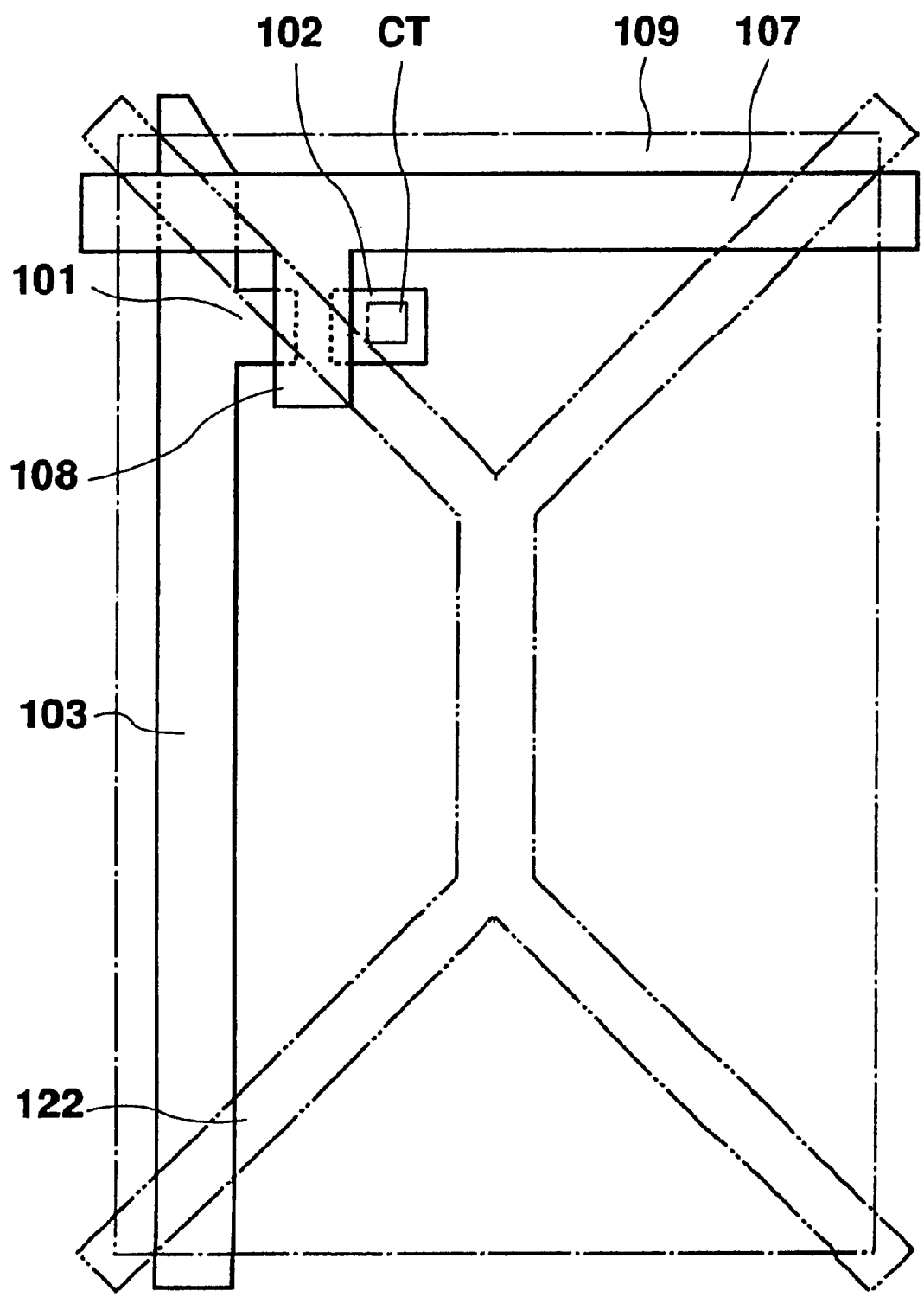
FIG. 21 is a plane view showing the structure of a unit pixel for an LCD according to a fourth preferred embodiment of the present invention.

FIG. 21 is a plane view showing a unit pixel for an LCD according to a fourth embodiment of the present invention. In this example, a rectangular pixel electrode 109 is employed. Accordingly, orientation control window 122 is formed having a linear part in a center region corresponding to around the inner part of pixel electrode 109.

Figure 22:
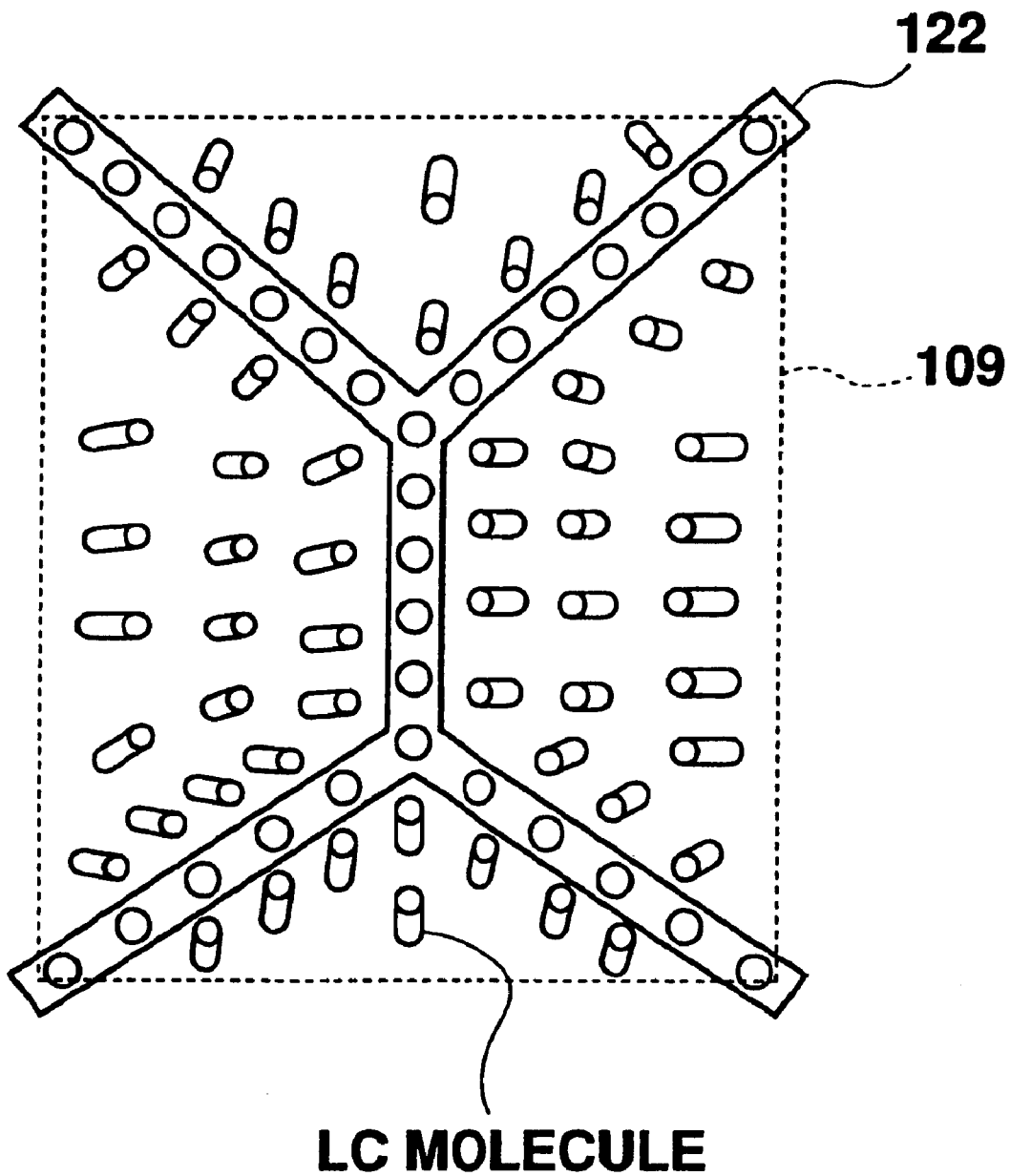
FIG. 22 shows approximate orientation of liquid crystal molecules in a driven state within one unit pixel having the structure shown in FIG. 21.

In the first, second, and third embodiments, none of the edges of pixel electrode 109 and a longitudinal direction of orientation control window 112 are parallel to each other. In such a structure, the continuum characteristic of liquid crystal alone maintains the continuity in orientation between liquid crystal molecules controlled to be directed perpendicular, in plane view, to the edge of pixel electrode 109 and those to the edge of the orientation control window. In other words, a boundary may be caused between different orientations within the liquid crystal between the edges of pixel electrode 109 and orientation control window 122. In order to eliminate such a boundary, a rectangular pixel electrode 109 is employed so as to create a long part of orientation control window 122 which runs parallel to the edges of pixel electrode 109. To be specific, orientation control window 122 includes a linear part and branch parts, the linear part runs substantially parallel to any of the edges of pixel electrode 109, and branch parts extend continuously from the ends of the linear part towards respective corners of pixel electrode 109. As shown in FIG. 22, this arrangement guarantees a relatively large area in which controls begun from around the edges of orientation control window 112 and those from around the edges of pixel electrode 109 designate the same orientation, as compared to areas in which they do not. As a result, the orientation boundary which may be formed somewhere in the liquid crystal layer between the edges of pixel electrode 109 and orientation control window 122 becomes relatively less influential, and orientation control can be made in a preferable manner.

What is claimed is:

1. A liquid crystal display comprising:

a first substrate;

a plurality of gate lines and a plurality of drain lines formed on the first substrate and defining a plurality of pixels;

a thin film transistor for each pixel formed on the first substrate, the thin film transistor having a gate electrode connected to a gate line, a drain electrode connected to a drain line, and source electrode;

an inter-layer insulation film having a thickness of at least 3 μm and formed over the thin film transistors, the gate lines and the drain lines;

a pixel electrode for each pixel, the pixel electrode being connected to the source electrode of the thin film transistor and at least partially formed on the inter-layer insulation film;

a second substrate disposed opposite the first substrate;

a liquid crystal layer filled between the first and second substrates; and a common electrode formed on the second substrate, wherein the common electrode defines an orientation control window disposed across the liquid crystal layer from each pixel, the orientation control window being a region on the second substrate free of the common electrode, wherein when a voltage is applied between the common electrode and the pixel electrode, weak electric fields are generated in the vicinity of the orientation control window, and electric fields in a sloped direction are generated around edges of the pixel electrode, so that the horizontal orientation of the liquid crystal molecules in a pixel electrode region is controlled through the weak electric fields and the electric fields in a sloped direction.

2. A liquid crystal display as defined in claim 1, wherein the inter-layer insulation film has a thickness α of at least 0.5 μm or over.

3. A liquid crystal display as defined in claim 1, wherein the inter-layer insulation film has a thickness α of at least 1 μm.

4. A liquid crystal display as defined in claim 1, wherein the inter-layer insulation film has a thickness α which is equal to or greater than a half of the interval χ between two adjacent pixel electrodes among the plurality of pixel electrodes.

5. A liquid crystal display as defined in claim 1, wherein each of the plurality of pixel electrodes is formed in a region defined by the gate line and the drain line and overlaps at least a part of the gate line and/or the drain line with the inter-layer insulation film interposed therebetween.

6. A liquid crystal display as defined in claim 5,
    wherein the inter-layer insulation film has a thickness α which is equal to or greater than a half of an interval χ between two adjacent pixel electrodes among the plurality of pixel electrodes.

7. A liquid crystal display as defined in claim 1, wherein the orientation control window is formed on a region opposing the pixel electrode along a diagonal direction thereof.

8. A liquid crystal display as defined in claim 1, wherein the orientation control window is formed having a substantial letter X shape whose crossing point falls on a region opposing to around a center of that pixel electrode.

9. A liquid crystal display as define in claim 1, wherein each orientation control window includes a linear part extending substantially in parallel to an edge of the corresponding pixel electrode, and a branch part extending continuously from each end of the linear part toward respective corners of the pixel electrode, the linear part being formed on a region closely opposing the center of the pixel electrode.

10. The liquid crystal display of claim 1, wherein at least parts of the thin film transistor, and/or the gate line, and/or the drain line are disposed below the corresponding pixel electrode with the inter-layer insulation film interposed therebetween.

11. A liquid crystal display device as defined in claim 10, wherein
    the thin film transistor, and/or the gate line, and/or the drain line are situated while being projected from a region where corresponding one of the plurality of pixel electrodes is formed by an extent y, a half value y/2 of the extent y being equal to or less than a thickness α of the inter-layer insulating film.

12. A liquid crystal display device as defined in claim 10, wherein
    the thin film transistor, and/or the gate line, and/or the drain line are situated while being projected from a region where corresponding one of the plurality of pixel electrodes is formed by an extent y, a half value y/2 of the extent y being equal to or less than a half of an interval χ between two adjacent pixel electrodes among the plurality of pixel electrodes.

13. A liquid crystal display as defined in claim 10, wherein the plurality of pixel electrodes are reflector electrodes made of conductive reflective material.

14. The liquid crystal display of claim 10, wherein the thin film transistors are separated from the liquid crystal by the inter-layer insulation layer and the pixel electrode.

15. The liquid crystal display of claim 10, wherein the gate lines and/or the drain lines are separated from the liquid crystal by the inter-layer insulation layer and the pixel electrode.

16. The liquid crystal display of claim 1, wherein the liquid crystal has a horizontal orientation controlled by an electric field formed by the pixel electrodes and the common electrode.

17. A method for forming a liquid crystal display device, comprising:

forming a plurality of gate lines and a plurality of drain lines on a surface of a first substrate, the gate and drain lines defining a plurality of pixels;

forming a thin film transistor for each pixel on the surface of the first substrate, the thin film transistor having a gate electrode connected to a gate line, a drain electrode connected to a drain line, and a source electrode;

forming an inter-layer insulation film having a thickness of at least 3 μm on the first substrate over the thin film transistors, the gate lines and the drain lines;

forming a pixel electrode for each pixel on the first substrate, the pixel electrode being connected to the source electrode of the thin film transistor and at least partially formed on the inter-layer insulation film;

forming a common electrode on a surface of a second substrate, the common electrode defining an orientation control window corresponding to each pixel of the first substrate, the orientation control window being a region on the second substrate free of the common electrode; and forming a liquid crystal cell by filling liquid crystal between the first and second substrates, the surface of the first substrate having the pixel electrodes and the surface of the second substrate having the common electrode facing each other.

18. The method of claim 17, wherein the inter-layer insulation film is at least about 0.5 μm thick.

19. The method of claim 17, wherein the inter-layer insulation film is at least about 1 μm thick.

20. The method of claim 17, wherein the inter-layer insulation film has a thickness equal to or greater than about a half of an interval between two adjacent pixel electrodes.

21. The method of claim 17, wherein each of the plurality of pixel electrodes is formed in a region defined by the gate line and the drain line and overlaps at least a part of the gate line and/or the drain line with the inter-layer insulation film interposed therebetween.

22. A liquid crystal display comprising:

a first substrate;

a plurality of gate lines and a plurality of drain lines formed on the first substrate and defining a plurality of pixels;

a thin film transistor for each pixel formed on the first substrate, the thin film transistor having a gate electrode connected to a gate line, a drain electrode connected to a drain line, and a source electrode;

an inter-layer insulation film formed over the thin film transistors, the gate lines and the drain lines;

a pixel electrode for each pixel, the pixel electrode being connected to the source electrode of the thin film transistor and at least partially formed on the inter-layer insulation film;

a second substrate disposed opposite the first substrate;

a liquid crystal layer filled between the first and second substrates; and a common electrode formed on the second substrate, wherein the common electrode defines an orientation control window disposed across the liquid crystal layer from each pixel, the orientation control window being a region on the second substrate free of the common electrode, wherein when a voltage is applied between the common electrode and the pixel electrode, weak electric fields are generated in the vicinity of the orientation control window, and electric fields in a sloped direction are generated around edges of the pixel electrode, so that the horizontal orientation of the liquid crystal molecules in a pixel electrode region is controlled through the weak electric fields and the electric fields in a sloped direction, and wherein the thickness of the insulation film is equal to or greater than a half of the interval between two adjacent pixel electrodes.

23. A method for forming a liquid crystal display device, comprising:

forming a plurality of gate lines and a plurality of drain lines on a surface of a first substrate, the gate and drain lines defining a plurality of pixels;

forming a thin film transistor for each pixel on the surface of the first substrate, the thin film transistor having a gate electrode connected to a gate line, a drain electrode connected to a drain line, and a source electrode;

forming an inter-layer insulation film on the first substrate over the thin film transistors, the gate lines and the drain lines;

forming a pixel electrode for each pixel on the first substrate, the pixel electrode being connected to the source electrode of the thin film transistor and at least partially formed on the inter-layer insulation film;

forming a common electrode on a surface of a second substrate, the common electrode defining an orientation control window corresponding to each pixel of the first substrate, the orientation control window being a region on the second substrate free of the common electrode; and forming a liquid crystal cell by filling liquid crystal between the first and second substrates, the surface of the first substrate having the pixel electrodes and the surface of the second substrate having the common electrode facing each other, wherein the thickness of the insulation film is equal to or greater than a half of the interval between two adjacent pixel electrodes.

* * * * *